(12) United States Patent
German et al.

(10) Patent No.: US 8,699,939 B2
(45) Date of Patent: *Apr. 15, 2014

(54) SYSTEM AND METHOD FOR RECOMMENDING EDUCATIONAL RESOURCES

(75) Inventors: Kristine A. German, Webster, NY (US); Robert M. Lofthus, Webster, NY (US); Robert Roy Price, Palo Alto, CA (US); Florent Perronnin, Domene (FR); Claudio Cifarelli, Grenoble (FR); Minh Do, Palo Alto, CA (US); Rong Zhou, San Jose, CA (US)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 1008 days.

This patent is subject to a terminal disclaimer.

(21) Appl. No.: 12/339,979

(22) Filed: Dec. 19, 2008

(65) Prior Publication Data
US 2010/0159432 A1 Jun. 24, 2010

(51) Int. Cl.
*G09B 3/00* (2006.01)

(52) U.S. Cl.
USPC .......................... 434/350; 434/322; 434/323

(58) Field of Classification Search
USPC ................................ 434/322, 323, 350, 362
See application file for complete search history.

(56) References Cited

U.S. PATENT DOCUMENTS

| | | |
|---|---|---|
| 4,464,118 A | 8/1984 | Scott et al. |
| 4,654,818 A | 3/1987 | Wetterau, Jr. |
| 4,793,810 A | 12/1988 | Beasley, Jr. |
| 5,387,107 A | 2/1995 | Gunter |
| 5,657,256 A | 8/1997 | Swanson |
| 5,730,602 A | 3/1998 | Gierhart et al. |
| RE36,028 E | 1/1999 | Deesen et al. |
| 5,995,959 A | 11/1999 | Friedman |
| 5,995,961 A | 11/1999 | Levy et al. |
| 6,026,397 A | 2/2000 | Sheppard |
| 6,030,226 A | 2/2000 | Hersh |

(Continued)

FOREIGN PATENT DOCUMENTS

| | | |
|---|---|---|
| EP | 553674 A2 | 8/1993 |
| EP | 0556530 | 8/1993 |

(Continued)

OTHER PUBLICATIONS

U.S. Appl. No. 12/640,426, filed Dec. 17, 2009, Venable.

(Continued)

*Primary Examiner* — Bruk Gebremichael
(74) *Attorney, Agent, or Firm* — Fay Sharpe LLP

(57) ABSTRACT

An educational recommender system and a method are provided. The method includes receiving a request to recommend a course of action related to a plurality of current students; accessing a computer database storing student data that corresponds to the plurality of current students; clustering in a computer process the plurality of current students into at least two clusters based at least on granular assessment data associated with student data corresponding to respective current students; and outputting the results of the clustering to a user. The granular assessment data includes a result of an assessment administered to respective students of the plurality of current students, and each assessment includes a plurality of questions for assessing one of the current students. The associated result includes an independent evaluation of each respective question of the plurality of questions.

31 Claims, 8 Drawing Sheets

(56) References Cited

U.S. PATENT DOCUMENTS

| | | | |
|---|---|---|---|
| 6,042,384 A | 3/2000 | Loiacono | |
| 6,049,777 A | 4/2000 | Sheena et al. | |
| 6,120,300 A | 9/2000 | Ho | |
| 6,134,559 A | 10/2000 | Brumme | |
| 6,144,838 A | 11/2000 | Sheehan | |
| 6,154,757 A | 11/2000 | Krause | |
| 6,215,901 B1 | 4/2001 | Schwartz | |
| 6,299,452 B1 | 10/2001 | Wasowicz | |
| 6,515,690 B1 | 2/2003 | Back | |
| 6,523,007 B2 | 2/2003 | Layng | |
| 6,546,230 B1* | 4/2003 | Allison | 434/350 |
| 6,606,479 B2 | 8/2003 | Cook | |
| 6,606,480 B1 | 8/2003 | L'Allier et al. | |
| 6,673,611 B2 | 1/2004 | Thompson | |
| 6,678,500 B2 | 1/2004 | Helmick et al. | |
| 6,755,657 B1 | 6/2004 | Wasowicz | |
| 6,759,206 B1 | 7/2004 | Rubin | |
| 6,789,089 B2 | 9/2004 | Scoggins | |
| 6,884,074 B2 | 4/2005 | Theilmann | |
| 6,953,343 B2 | 10/2005 | Townshend | |
| 6,983,240 B2 | 1/2006 | Ait-Mokhtar et al. | |
| 7,036,075 B2 | 4/2006 | Walker | |
| 7,058,567 B2 | 6/2006 | Ait-Mokhtar et al. | |
| 7,147,473 B2 | 12/2006 | Harpaz | |
| 7,152,034 B1 | 12/2006 | Layng | |
| 7,207,804 B2 | 4/2007 | Hersh | |
| 7,266,340 B2 | 9/2007 | Bresciani | |
| 7,293,239 B2 | 11/2007 | Gorbet | |
| 7,483,670 B2 | 1/2009 | Walker et al. | |
| 7,593,910 B1 | 9/2009 | Owen | |
| 7,734,652 B2 | 6/2010 | Tamayo | |
| 7,828,552 B2 | 11/2010 | Shute | |
| 8,135,718 B1* | 3/2012 | Das et al. | 707/748 |
| 8,155,578 B2 | 4/2012 | Cody | |
| 8,203,743 B2 | 6/2012 | Horikawa | |
| 2002/0182573 A1 | 12/2002 | Watson | |
| 2003/0086116 A1 | 5/2003 | Hall et al. | |
| 2003/0113698 A1 | 6/2003 | Von der Geest | |
| 2003/0149612 A1 | 8/2003 | Berghofer et al. | |
| 2003/0180703 A1* | 9/2003 | Yates et al. | 434/353 |
| 2003/0190593 A1 | 10/2003 | Wisnoksy | |
| 2003/0194690 A1* | 10/2003 | Wessner et al. | 434/350 |
| 2004/0023191 A1 | 2/2004 | Brown | |
| 2004/0049391 A1 | 3/2004 | Polanyi | |
| 2004/0076930 A1 | 4/2004 | Steinberg | |
| 2004/0093346 A1 | 5/2004 | Hochman | |
| 2004/0115596 A1* | 6/2004 | Snyder et al. | 434/118 |
| 2004/0121298 A1 | 6/2004 | Creamer | |
| 2004/0180317 A1* | 9/2004 | Bodner et al. | 434/353 |
| 2004/0219502 A1 | 11/2004 | Bechard | |
| 2005/0053908 A1 | 3/2005 | Satheesh et al. | |
| 2005/0114160 A1 | 5/2005 | Boehme et al. | |
| 2005/0138556 A1 | 6/2005 | Brun | |
| 2005/0170325 A1 | 8/2005 | Steinberg | |
| 2005/0197988 A1 | 9/2005 | Bublitz | |
| 2005/0221266 A1 | 10/2005 | Mislevy | |
| 2005/0227216 A1 | 10/2005 | Gupta | |
| 2005/0246354 A1* | 11/2005 | Tamayo et al. | 707/100 |
| 2006/0003306 A1 | 1/2006 | McGinley et al. | |
| 2006/0040240 A1 | 2/2006 | Kopilevich | |
| 2006/0046239 A1 | 3/2006 | Allen et al. | |
| 2006/0078863 A1* | 4/2006 | Coleman et al. | 434/322 |
| 2006/0095852 A1* | 5/2006 | Trepess et al. | 715/741 |
| 2006/0105313 A1* | 5/2006 | Mansfield et al. | 434/350 |
| 2006/0160054 A1 | 7/2006 | Onishi et al. | |
| 2006/0166174 A1* | 7/2006 | Rowe et al. | 434/236 |
| 2006/0241988 A1 | 10/2006 | Yaskin | |
| 2006/0242003 A1 | 10/2006 | Yaskin | |
| 2006/0242004 A1 | 10/2006 | Yaskin | |
| 2006/0257841 A1 | 11/2006 | Mangano | |
| 2007/0172810 A1 | 7/2007 | McCallum | |
| 2007/0179776 A1 | 8/2007 | Segond | |
| 2007/0190514 A1 | 8/2007 | Diaz | |
| 2007/0218432 A1 | 9/2007 | Glass | |
| 2007/0224586 A1 | 9/2007 | Massie et al. | |
| 2007/0250497 A1 | 10/2007 | Mansfield et al. | |
| 2008/0038708 A1 | 2/2008 | Slivka | |
| 2008/0227075 A1 | 9/2008 | Poor et al. | |
| 2008/0241812 A1 | 10/2008 | Ashmore et al. | |
| 2008/0286732 A1 | 11/2008 | German | |
| 2009/0186329 A1* | 7/2009 | Connor | 434/350 |
| 2009/0204596 A1 | 8/2009 | Brun | |
| 2009/0246744 A1 | 10/2009 | Lofthus | |
| 2009/0271433 A1 | 10/2009 | Perronnin | |
| 2009/0287739 A1 | 11/2009 | Zhang | |
| 2010/0075290 A1 | 3/2010 | DeYoung | |
| 2010/0075291 A1 | 3/2010 | DeYoung et al. | |
| 2010/0075292 A1 | 3/2010 | DeYoung et al. | |
| 2010/0100455 A1 | 4/2010 | Song | |
| 2010/0157345 A1 | 6/2010 | Lofthus | |
| 2010/0158707 A1 | 6/2010 | Griffiths | |
| 2010/0159432 A1 | 6/2010 | German | |
| 2010/0159437 A1 | 6/2010 | German | |
| 2010/0159438 A1 | 6/2010 | German et al. | |
| 2010/0227306 A1 | 9/2010 | Lofthus | |

FOREIGN PATENT DOCUMENTS

| | | |
|---|---|---|
| EP | 0 805 410 A | 5/1997 |
| EP | 805410 A3 | 3/1999 |
| JP | 2000123115 | 4/2000 |
| JP | 2000123115 A2 | 4/2000 |
| WO | WO 98/32107 | 7/1998 |
| WO | WO 02/21259 | 3/2002 |
| WO | WO 2004/090834 | 10/2004 |
| WO | WO2006121542 A2 | 11/2006 |

OTHER PUBLICATIONS

U.S. Appl. No. 12/701,850, filed Feb. 8, 2010, DeYoung.
U.S. Appl. No. 12/840,584, filed Jul. 21, 2010, Venable.
U.S. Appl. No. 12/958,768, filed Dec. 2, 2010, German.
Johnson, David W. et al., "An Overview of Cooperative Learning", Cooperative Learning Institute and Interaction Book Company.
Shi, Jianbo et al., "Normalized Cuts and Image Segmentation", IEEE Transactions on Pattern Alanaysis and Machine Intelligence, vo. 22, No. 8, Aug. 2000.
Wren, Ph.D., Sbebastian et al., "The Abecedarian Reading Assessment", www.balancedreading.com, Copyright, 2002, pp. 1-49.
"Cluster Analysis." Wikipedia, the Free Encyclopedia. Apr. 28, 2010. Web. Jan. 11, 2011. <http://en.wikipedia.org/wiki/Cluster_analysis>.
"Cut (graph theory)." Wikipedia, the Free Encylopedia. Mar. 25, 2010. Web. Jan. 11, 2011. <http://en.wikipedia.org/wiki/Cut_(graph_theory)>.
"Edmonds's matching Algorithm," Wikipedia, the Free Encyclopedia. Feb. 16, 2010. Web. Jan. 11, 2011. <http://en.wikipedia.org/wiki/Edmonds's_matching_algorithm>.
"Ford-Fulkerson Algorithm." Wikipedia, the Free Encyclopedia. Apr. 21, 2010. Web. Jan. 11, 2010. <http://en.wikipedia.org/wiki/Ford-Fulkerson_algorithm>.
"k-medoids" Wikipedia, the Free Encyclopedia. Apr. 22, 2010. Web. Jan. 11, 2010. <http://en.wikipedia.org/wiki/K-medoids>.
"Matching (graph theory) )." Wikipedia, the Free Encyclopedia. Apr. 19, 2009. Web. Jan. 11, 2011. <http://en.wikipedia.org/wiki/Matching_(graph_theory)>.
Chuat, "CategoriX & ClusteriX", Xerox Research Centre Europe, licensing@xrce.xerox.com (May 2005).
International Search Report for EP 09 17 7730 dated Apr. 28, 2010.
U.S. Appl. No. 12/237,692, filed Sep. 25, 2008, DeYoung et a.
U.S. Appl. No. 12/109,496, filed Apr. 25, 2008, Perronnin et al.
U.S. Appl. No. 12/054,824, filed Mar. 25, 2008, Lofthus et al.
Bisset, Brian, "Expanding the MFP Ecosystem with Xerox's Extensible Interface Platform (EIP)", Jun. 2008, Bissett Communications Corp., pp. 1-18, XP55003175, retrieved from the Internet: http://www.office.xerox.com/latest/XOGWP-09U.
Anonymous, "Xerox Extensible Interface Platform (EIP)", May 2008, Xerox Corporation, pp. 1-4, XP55003200, retrieved from the Internet: http://www.office.xerox.com/latest/EIPBR-01.
The Abecedarian Reading Assessment, Sebastian Wren, Ph.D and Jennifer Watts, Ph.D., Copyright, 2002.

* cited by examiner

SYSTEM AND METHOD FOR RECOMMENDING EDUCATIONAL RESOURCES

CROSS-REFERENCE TO RELATED APPLICATIONS

The present application is further related to U.S. patent application Ser. No. 11/749,192, filed on May 16, 2007; U.S. patent application Ser. No. 12/054,824, filed on Mar. 25, 2008; U.S. patent application Ser. No. 12/109,496, filed on Apr. 25, 2008; U.S. patent application Ser. No. 12/237,692, filed on Sep. 25, 2008; and U.S. patent application Ser. Nos. 12/339,771, 12/339,804 both filed on Dec. 19, 2008.

BACKGROUND

The present disclosure relates generally to a system and method for recommending educational resources. In particular, the present disclosure relates to applying clustering algorithms to student data for recommending educational resources.

Educational choices, such as grouping of students into classes, grouping students into groups for particular educational activities, selecting appropriate educational material, matching students to best suited educational aides, determining when and what educational interventions to use for students, etc., are based on information readily available to the educator making the decisions.

However, the information available is limited in at least two ways. The information is limited to the information available for the current students for whom the educational choices are being made. Similar decisions may have been made for other students having similar situations, with or without success, but that information is not available to the decision maker. Furthermore, the information about the current students may include assessment data, such as test scores or academic grades, which provide an overall indication of academic performance but may not indicate where specific weaknesses or knowledge deficits exist.

The process of making such educational decisions involving grouping students is complicated even with the limited amount of information, and would be all the more complicated with a large increase in information. Each time a decision is made the decision is static. Any change in constraints considered during the decision making process, such as due to a change in circumstances or the decision makers desire to consider different constraints, requires that the decision maker repeat the complicated decision making process.

SUMMARY

The present disclosure is directed to a recommender system for recommending clustering of students into educational groups. The recommender system includes a processor for executing a series of programmable instructions for receiving a request to recommend a course of action related to a plurality of current students and accessing student data relating to a plurality of students. The student data includes granular assessment data, which includes a result of an assessment administered to respective students of the plurality of students. Each assessment includes a plurality of questions for assessing one of the students, and the associated result includes an independent evaluation of each respective question of the plurality of questions. The processor further clusters the plurality of current students into at least two clusters based at least on the granular assessment data associated with student data corresponding to respective current students of the plurality of current students and outputs the results of the clustering to a user.

The present disclosure is also directed to a method for recommending clustering of students into educational groups, the method including receiving a request to recommend a course of action related to a plurality of current students; accessing a computer database storing student data that corresponds to the plurality of current students; clustering in a computer process the plurality of current students into at least two clusters based at least on granular assessment data associated with student data corresponding to respective current students. The granular assessment data includes a result of an assessment administered to respective students of the plurality of current students, and each assessment includes a plurality of questions for assessing one of the current students. The associated result includes an independent evaluation of each respective question of the plurality of questions. The method further includes outputting the results of the clustering to a user.

The present disclosure is also directed to a computer-readable medium storing a series of programmable instructions configured for execution by at least one processor for recommending clustering of students into educational groups, including the steps of receiving a request to recommend a course of action related to a plurality of current students, accessing student data that corresponds to the plurality of current students, clustering the plurality of current students into at least two clusters based at least on granular assessment data associated with student data corresponding to respective current students, and outputting the results of the clustering to a user. The granular assessment data includes a result of an assessment administered to respective students of the plurality of current students, wherein each assessment includes a plurality of questions for assessing one of the current students. The associated result includes an independent evaluation of each respective question of the plurality of questions.

Other features of the presently disclosed recommender system will become apparent from the following detailed description, taken in conjunction with the accompanying drawings, which illustrate, by way of example, the presently disclosed recommender system.

BRIEF DESCRIPTION OF THE DRAWINGS

Various embodiments of the present disclosure will be described below with reference to the figures, wherein:

FIGS. 3 and 4 show a flowchart of a method used by the educational recommender system shown in FIG. 1 for clustering a group of students into clusters in accordance with the present disclosure;

DETAILED DESCRIPTION

Figure 1:
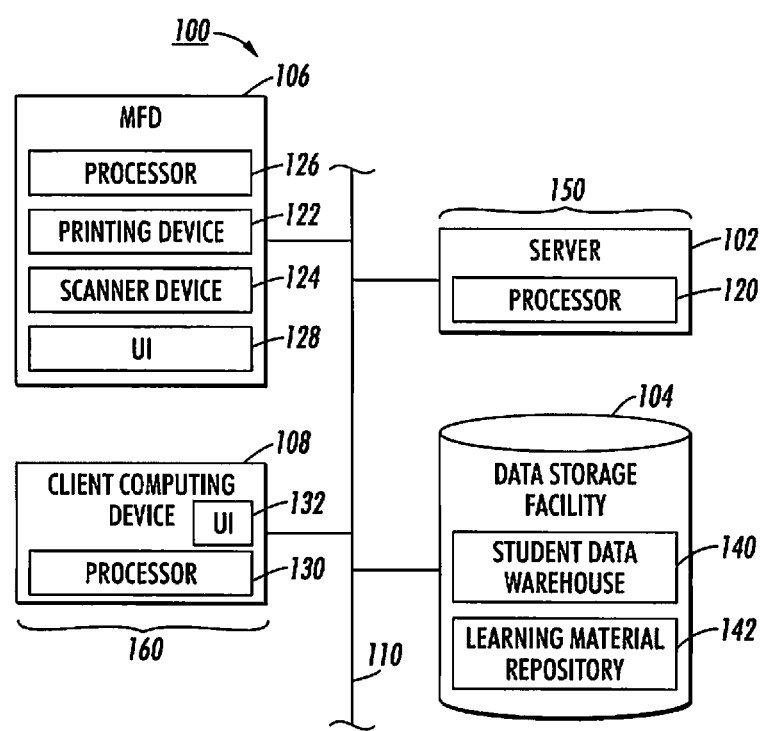
FIG. 1 is a block diagram of an exemplary educational recommender system in accordance with the present disclosure.

Referring now to the drawing figures, in which like references numerals identify identical or corresponding elements, the educational recommender system and method in accordance with the present disclosure will now be described in detail. With initial reference to FIG. 1, an exemplary educational recommender system in accordance with the present disclosure is illustrated and is designated generally as educational recommender system 100.

Recommender system 100 includes a server 102 having access to a data storage facility 104. At least one multifunction device (MFD) 106 and at least one client computing device 108 are in data communication with the server 102 and the data storage facility 104 via a network 110 for requesting recommendations and updating the data stored in the data storage facility 104.

The network 10 may be the Internet, an intranet, an Ethernet, a LAN, a WAN, or other means for providing data communication between a plurality of digital devices. It is also envisioned that the data communication between any of the components of the recommender system 100 may be via a direct connection which may be wired or wireless. In the present example, the network 10 is the Internet.

The server 102 is a computing device having a processor 120 and all necessary communication devices for communicating with the data storage facility 104, MFD 106, and/or client computing device 108, either directly or via the network 110. The server 102 includes a computer that executes software for providing the service of gathering educational data and providing educational recommendations to the client computing devices. For example, the server 102 may include a web server, a server, a minicomputer, a mainframe computer, a personal computer, a mobile computing device, etc. The processor 120 of the server 102 executes a recommender software module for processing requests and providing recommendations. The recommender software module, described further below, includes a series of programmable instructions capable of being executed by the processor 120. The series of programmable instructions can be stored on a computer-readable medium accessible by the processor 120, such as RAM, a hard drive, CD, smart card, 3.5" diskette, etc., or transmitted via propagated signals for being executed by the processor 120 for performing the functions disclosed herein and to achieve a technical effect in accordance with the disclosure. The functions of the recommender software module may be combined into one module or distributed among a different combination of modules.

The data storage facility 104 includes at least one nonvolatile storage device for storing information that the server 102 needs to access for making requested recommendations. In the current example, the data storage facility 104 includes a first storage device, a student data warehouse 140 and a learning material repository 142. Software necessary for accessing data in the data storage facility 104, including retrieving data, manipulating data and storing data, may be included in the server 102 and/or the data storage facility 104. The server 102 and the data storage facility 104 may be configured as one component or may be configured as separate components which are in data communication.

The student data warehouse 140 stores student data related to a plurality of students. The student data includes attributes associated with each student, such as, personal data which is substantially static, requiring little or infrequent updating (e.g., schools attended, school currently attending, birth date, gender, geographical location, socioeconomic information, health information, school district, grade, classroom, etc.); and experiential data which is likely to be dynamic and frequently updated. The experiential data includes attribute data such as school attendance data (e.g., number of absences); assessment data (e.g., granular data (described further below), overall score on particular assessments, mastery (e.g., expressed in percentages) of a variety of subjects and/or skills, etc.); past experience and feedback data (e.g., interventions used (e.g., behavior modification methods, academic reinforcements, peer assisted learning experience (e.g., number of sessions, identifications of peers, etc.), tutoring experience (as tutor or student having been tutored, e.g., number of sessions, identifications of tutors, etc.), including feedback and/or success data on each of these); preference data (e.g., preferred instructional mode (see Table 1), teacher disposition (e.g., strict, humorous, creative, etc.), interests (and disinterests, e.g., hobbies); challenges (which may be based on analysis of assessment data or include challenges not assessed, such as a physical, emotional, social or learning disability or weakness); special needs data (e.g., proficiency in English as a second language, measures of dyslexia); leader disposition data (e.g., leader or follower); schedule data (e.g., student's class schedule); absolute constraints (e.g., pair student with a particular teacher, tutor, or peer, provide student with a particular set of learning materials, etc.); and subjective feedback data about an educational tool used; etc. In one example, a portion of the student data, e.g., the personal data, may be configured as metadata.

The student data warehouse 140 additionally may store educator data describing attributes of a plurality of educators, e.g., teachers, specialists, and/or tutors. This data may include personal data and experiential data, such as data about the teacher's disposition, teaching style, experience, evaluations by superiors, etc.

Each of the attributes in the experiential data for students and educators, where appropriate, may be associated with a strength score which may be used for weighting purposes when determining sameness (described further below), such as expressed on a scale of 1 to 10, to indicate the strength of the attribute. Also associated with the attributes, particularly attributes related to assessment or mastery of a skill, is information describing which educator, methodology, style, materials, assessments, etc., were involved in educating the student with respect to the skill.

The learning material repository 142 includes educational material data. The educational material data includes, for example, physical material (e.g., paper-based text books, work sheets, assessments, visual displays (e.g., maps, graphs), etc.) and digital material (e.g., computerized interactive teaching programs, assessments, games, visual displays, etc.), which may be used at a variety of difficulty levels for teaching a variety of skills and/or topics. Such material may include material for teaching and assessing academic subjects, such as reading, math, science, history, geography, etc. materials. The material may include fixed data or dynamic data. An example of material having dynamic data is material employing natural language processing (NLP), described further below. The educational material data further includes data describing instructional material attributes, for example, a curriculum section, study unit, state standard, suggested instructional methodology, etc.

The educational material data may include the actual material in documents or other digital files, or may include references and/or links to the material. The educational material data further includes attributes associated with each material or methodology, such as the author or creator, publisher, educational style, length, difficulty level, subject matter or topic, skills addressed, degree of diversity or homogeneousness of topic, etc. In one example, the attributes or a portion thereof are configured as metadata.

The student data, educator data and educational material data are all searchable and interrelated. Student assessment data is linked or associated with the student that was assessed, the educational materials which were used, the educator(s) which taught the material. Accordingly, it is possible to associate a level of success (or lack of success) which may include an overall level (based on an overall score) or a granular level (based on granular data of an assessment), with student attributes, educator attributes and educational material attributes.

Table 1 below depicts exemplary and non-comprehensive attribute matrices for storing student data, educator data and educational material data which may be used for matching educators, students and/or educational materials. Each attribute may be assigned either a binary tag or a numerical rating based on various methods, such as subjective rating, empirical rating, semi-empirical rating, or inferred clustering. Attributes such as these can then be selected and assigned a weighted value for inclusion in clustering constraints which control the clustering of students for the formulation of one or more clusters. The initial selection and weighting of attributes can be made either when submitting a request for a service, or may be pre-assign default values. Additionally, the selection and weighting of the attributes can be adjusted in an interactive fashion until the user is satisfied with the recommendations generated by the server 102.

| Classroom setting | Teacher promotes a classroom setting that is | Student learns well in a classroom setting that is | Learning activity material is suited to a classroom setting that is |
|---|---|---|---|
| Structured | | | |
| Flexible | | | |
| Predictable | | | |
| Spontaneous | | | |
| Quiet | | | |
| Lively | | | |
| Relaxed | | | |
| High energy | | | |

| Areas of interests | Teacher readily relates instruction to | Student has interest in | Learning activity material relates to |
|---|---|---|---|
| Music - listening, making, vocal, instrumental, etc. | | | |
| Sports - by type - fan, active participant | | | |
| Animals - pets, wildlife, imaginary | | | |
| Games - by type | | | |
| Popular characters - by character | | | |
| Visual Art - viewing, making | | | |
| Theater, Performance Art - viewing, making | | | |
| Science - by field | | | |
| Puzzles - by type | | | |

| Instructional mode | Teacher emphasizes learning activities where | Student learns well in activities that utilize | Learning activity material emphasizes |
|---|---|---|---|
| Student(s) Listen to Instructions | | | |
| Student(s) Listen to Narrative | | | |
| Student(s) Listen to Descriptions | | | |
| Student(s) Verbalize | | | |
| Student(s) Read Text | | | |
| Student(s) View Pictures | | | |
| Student(s) View Graphs | | | |
| Student(s) View Video | | | |
| Student(s) Write Text | | | |
| Student(s) Draw Pictures | | | |
| Student(s) Draw Graphs | | | |
| Student(s) Move or Handle Objects | | | |
| Student(s) Assemble or Build Objects | | | |
| Student(s) Work Independently | | | |
| Student(s) Work in Cooperative Groups | | | |
| Student(s) Select from Multiple Concurrent Activities | | | |
| Students(s) Rotate through Multiple Concurrent Activities | | | |
| Student(s) Work Concurrently on One Activity at a Time | | | |

| Special needs | Teacher has extra expertise in student needs for | Student needs accommodation for | Learning activity material is amendable to/ specifically addresses |
|---|---|---|---|
| English as a Second Language | | | |
| Dyslexia - reading disability | | | |
| Dyscalculia - math disability | | | |
| Dysphasia/aphasia - writing disability | | | |
| ADHD | | | |
| Autism | | | |
| Asperger Syndrome - poor social, non-verbal comprehension | | | |
| Auditory Processing Disorder | | | |
| Motor Impairment - Dyspraxia, poor visual-motor integration skills | | | |
| Motor Impairment - Physical, Neurological | | | |
| Visual Impairment | | | |
| Speech Impairment | | | |
| Reading Remediation | | | |
| Writing Remediation | | | |
| Math Remediation | | | |

The MFD 106 includes a printer device 122, a scanner device 124, a processor 126, a user interface (UI) 128, and all necessary communication devices for communicating with the data storage facility 104, server 102, and/or client computing device 108, either directly or via the network 110. The printer device 122, scanner 124 and processor 126 may be integrated and housed in a single housing or may be separate components which are interfaced to one another. The printer device 122 includes any apparatus or system, such as a digital copier, xerographic printing system, ink jet printing system, reprographic printing system, bookmaking machine, facsimile machine, etc., which performs a marking output function for any purpose. The modality for marking may include, for example, applying toner, ink, dye, etc., to the substrate, etc. the substrate. The substrate may be a material such as paper, cardboard, a transparency, a paper derivative, etc.

The scanner device 124 of the MFD 106 includes hardware for imaging a document and generating corresponding imaging data. The image data is stored by a storage device that is included with the processor 126 or accessible to the processor 126. The processor 126 executes a scanner software module for processing the image data. The processor 126 further executes a granular assessment data generator (GADG) module for processing image data corresponding to assessment documents, determining which markings included in the image data correspond to human markings and generating granular assessment data corresponding to the human markings indicating assessment answers. The processor 126 further executes an educational recommender interface (ERI) software module for enabling the processor 126 to communicate with the server 102 and/or data storage facility 104, to receive input and generate output to users via the UI 128 and to process data for providing educational recommender functionality as described further below.

The UI 128 includes a user input device, such as a keypad, touchpad, touch screen or the equivalent, and a display device, such as indicator lights, a display screen, etc. The UI 128 may provide a graphical user interface (GUI) via which the user may enter and receive information. The communication devices may be integrated into the MFD 106 or may be provided as a separate unit. In addition to providing communication capabilities, the communication devices may buffer data, such as for safeguarding data in the event of a failure, such as a power failure or network crash.

The client computer device 108 is a computing device, such as personal computer or a mobile computing device, having a processor 130, a UI 132 and all necessary communication devices for communicating with the data storage facility 104, MFD 106, and/or server 102, either directly or via the network 110. The UI 132 includes a user input device, such as a keyboard, keypad, touchpad, mouse, touch screen or the equivalent, and a display device, such as indicator lights, a display screen, etc. The UI 132 may provide a graphical user interface (GUI) via which the user may enter and receive information. The processor 130 executes an ERI software module for enabling the processor 126 to communicate with the server 102, data storage facility 104, and/or MFD 106, to receive input and generate output to users via the UI 128, and to process data for providing educational recommender functionality as described further below. The ERI module executed by the processor 130 may be an enhanced version relative to the ERI module executed by the processor 126 of the MFD 106, both of which are described in greater detail below.

Each of the software modules, including the ERI and GADG modules includes a series of programmable instructions capable of being executed by the corresponding processors 126 or 130. The series of programmable instructions can be stored on a computer-readable medium, such as RAM, a hard drive, CD, smart card, 3.5" diskette, etc., or transmitted via propagated signals for being executed by the processors 126 or 130 for performing the functions disclosed herein and to achieve a technical effect in accordance with the disclosure. The functions of the respective software modules may be combined into one module or distributed among a different combination of modules.

Operation of the recommender system 100 is now described. The server 102 and data storage facility 104, referred to as the education recommender service (ERS) provider 150, provide a service to a client 160. Each client 160 gains access to the service as provided by the ERS provider 150, such as by subscribing to the service and loading the necessary software onto at least one MFD 106 and/or computing device 108. The clients 160 may access the service for submitting a request for an educational recommendation or for submitting data to be stored in the data storage facility 104. The data in the data storage facility 104 is accumulated over time by the clients 160 submitting learning material and data about students the client 160 is representing, as well as by an administrator of the service, who may store learning materials and attributes about students of non-clients (such as based on studies). The data is associated with metadata, labels, other fields of data, etc., so that it can be categorized and located when needed. Accordingly, the data storage facility 104 may hold a relatively small amount of data at its inception, but accumulates a large amount of data over time.

Clients 160 submit data to the data storage facility 104 either via a client computing device 108 or an MFD 106. In addition to subscribing to the service, the client 160 may store data about students it represents locally, such as on a local database, or it may rely on the ERS provider 150 for data storage partially or completely. As the client 160 receives or generates learning material or student data (which includes student attribute data and may further include associated metadata) it submits the data to the ERS provider 150 for storage. The client computing device 108 receives input information through data entry, such as via a user input device (e.g., keyboard, mouse), or by accessing stored data, such as already stored on an existing database. The client 160's MFD 106 receives input in the form of documents that are scanned in, and generates corresponding output that is provided to the ERS provider 150. The output may be image data, such as in a .pdf or .tiff format, or may be converted into another format, such as via optical character recognition (OCR) into a text format, such as .doc or .wpd.

The MFD 106 further processes assessment documents using its GADG module and generates corresponding assessment data. U.S. patent application Ser. No. 12/237,692 and two additional patent applications, all entitled "AUTOMATIC EDUCATIONAL ASSESSMENT SERVICE", both filed concurrently with the present application on Dec. 19, 2008 and both by DeYoung et al., all describe a system and method for processing assessment documents and generating assessment data, the entire contents of all of which are incorporated by reference herein in their entirety. The assessment documents are answer sheets that are marked up by a student being assessed or a teacher assessing a student and which correspond to a test or an assessment. The answer sheets are originally provided by the data storage facility 104, and may be printed by the MFD 106.

The assessment or test is administered to a student, and the answer sheet is marked by the student or a teacher administering the assessment in accordance with the student's answers. The assessment may include a plurality of questions, and includes an answer input area that corresponds to each question. One example of an assessment given to young students for testing learning fluency in reading is an assessment in which the teacher shows the student a chart including a variety of letters, similar to an eye chart, and asks the student to read each letter. The teacher puts a mark on each letter, where the mark indicates speed and/or accuracy. Another example of an assessment is a multiple choice test in which the student is presented with a plurality of questions and for each question selects one or more answers from a variety of answers and circles the selected answer. Another example of an assessment is in which the student writes the answer (e.g., alphanumeric characters or other symbols) in a blank or box provided on the assessment. A further example of an assessment is a matching exercise in which the student draws a line from each item in one list to a respective item in a second list to show a correlation.

Accordingly, educator or student entered marks that correspond to the student's answers (or performance) are entered in the appropriate answer input area. In the present example, the completed assessment is scanned in by an MFD 106, however other methods of generating and recording the granular data is within the scope of the present application. The MFD 106 which scans in the marked-up assessment is provided by the data storage facility 104 with a template of an unmarked version of the assessment. The MFD 106 executes the GADG module for extracting the markings from the marked-up assessment by comparing the marked-up assessment to the template of the unmarked assessment. The extracted markings that correspond to each answer input area are the student generated answers.

The extracted marking data is either processed by the MFD 106, the client computing device 108 or the server 102 by comparing the extracted marking data to rubric data provided by the data storage facility 104 that corresponds to the administered assessment. The result of the comparing is granular assessment data that indicates the student's performance for each question in the administered assessment. The indication of the student's performance for a particular question may indicate if the student answered correctly or incorrectly for that question, and may further indicate the type of mistake that the student made. The granular assessment data is stored and associated with the student that was assessed and the particular assessment used. Additionally, the granular assessment data is associated with educational resources involved in teaching the subject matter to the student being assessed. The granular assessment data may further be associated with other entities stored that are related to the subject matter covered by the assessment used for generating the granular assessment data, such as the educator that administered the assessment, and/or a curriculum section, study unit or state standard which covers the subject matter of the assessment, By providing granular assessment data rather than a single overall score, an assessment may identify a pattern of errors, such as for identifying a particular academic weakness.

While the description of granular assessment data is described with respect to gathering the granular assessment data via the MFD 106, the granular assessment data may be provided to the server 102 and/or data storage facility 104 by any source. The granular assessment data, regardless of its source, includes a result of an assessment administered to a student, wherein the assessment includes a plurality of questions for the assessing the current student and the granular assessment data includes an independent evaluation of each respective question of the plurality of questions.

Figure 2:
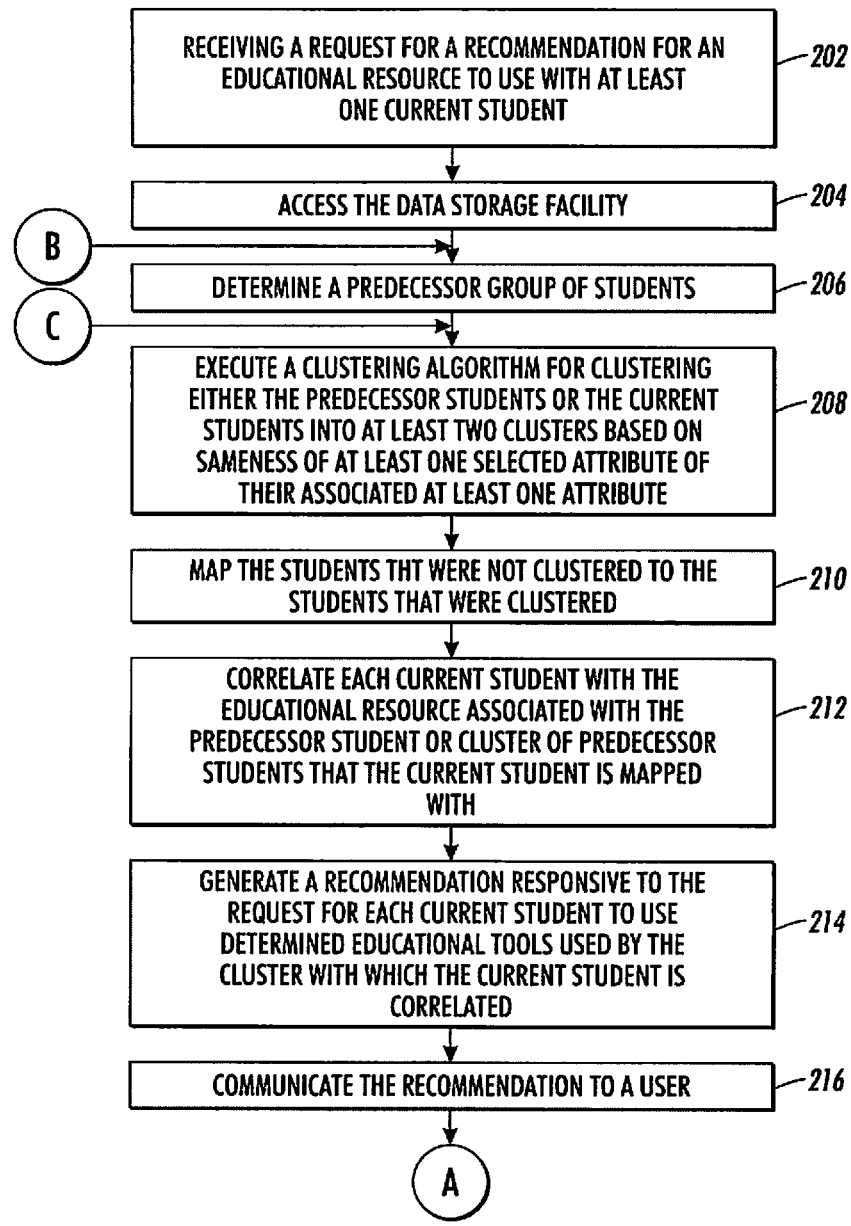
FIGS. 2 and 3 show a flowchart of a method used by the educational recommender system shown in FIG. 1 for recommending an educational resource to use for one or more current student in accordance with the present disclosure.
Figure 3:
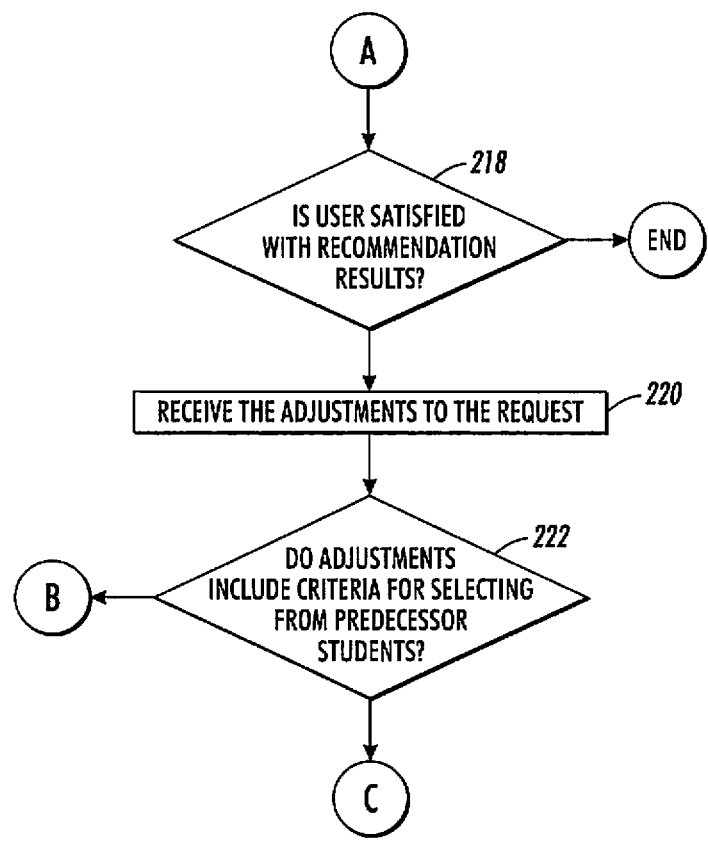

Processing by the service provider 150 of a request for an educational recommendation for a group of at least one current student is now described with reference to FIGS. 2 and 3. At step 202, the server 102 receives a request for a recommendation for an educational resource for use with one or more current students based on a one or more student attributes associated with the current students. The educational resource may be an action (e.g., how to group the current students), instructional method (e.g., curriculum to implement with the current students), material (e.g., text book to use with the current students), or educator (teacher or tutor to assign to the current students or group thereof), etc. Examples of educational resources include clustering the current students into groups for educational activities or for assigning current students to particular teachers or tutors, identifying risk factors in students such as gaps in academic skills or content, and suggesting learning materials or educators to use.

The request identifies the group of current students and the type of recommendation requested so that student data related to the current students may be located using the information included in the request. If there is not student data yet stored in the data storage facility 104 for the current students, then the request should include new student data about the current students. As per the request, the new student data will be used to process the request and may further be stored in the data storage facility 104. The group of current students includes at least one current student.

The request may further identify a predecessor group which is a group of students other than the current students for which student data is stored in the data storage facility 104. Student data associated with the predecessor group is used to process the request. The default predecessor group is all students other than the current students for which student data is stored. The predecessor group can be further narrowed down to students that have particular similarities to the current students which are relevant to the type of request. For example, if the request is for an educational recommendation about fifth graders, the predecessor group will include all students for which data related to when they were in the fifth grade is available. If the request is for an educational recommendation about preparing for a New York state administered exam for fifth graders having dysphasia/aphasia, then the predecessor group will include all students which prepared for that particular exam and have dysphasialaphasia. The predecessor group may further be narrowed down to students that had a specified level of success (e.g., scored 80% or above on the exam). Formation of the predecessor group is based either on information specified in the request, or on information deduced by sameness or similarities among the current students based on data available on the current students. The term "similar" in this context refers to the same concept of "sameness" which is described further below with respect to clustering and mapping.

Examples of student attributes which may be used to narrow down the predecessor group include academic abilities or gaps as indicated by assessment data, preferred learning styles or learning styles associated with academic success, leadership qualities, academic and non-academic interests, history of performance based on assessments, previously identified weaknesses or strengths, previous interventions used and success thereof, previous experience with particular teachers, tutors, peers, educational materials and academic success associated with previous experience, The request may further include one or more constraints that the user submitting the request wants to be applied to the processing of the predecessor and/or current students, e.g., clustering and/or mapping of the predecessor and/or current students (described further below); weights to be applied to the constraints when applied to the processing; and/or criteria for selecting from the predecessor group for narrowing down the predecessor group. The constraints may include selection constraints, clustering constraints, mapping constraints, and/or success constraints which are described in greater detail below.

At step 204, the server 102 accesses the data storage facility 104. At optional step 206, the server 102 determines a predecessor group of students including a plurality of predecessor students. The predecessor group includes students that are, or were, at a similar educational stage as the group of current students (e.g., in the same grade, took a particular test or academic course that the recommendation is related to, etc.).

The predecessor group may be selected by determining sameness relative to the plurality of current students (see below for a detailed description of determining sameness). The predecessor group may further be selected based on selected criteria specified in the selection constraints, such as narrowed down to include students that achieved a selected degree of success in that group, e.g., received a score above (or below, which indicates a lack of success) a threshold score for a particular assessment. The selection constraints may be set by an administrator or may be specified in the request submitted by the user. Alternatively, the predecessor group may include all or most students for which associated student data is stored in the data storage facility 104.

At step 208, the server 102 executes a clustering algorithm for clustering either the predecessor students or the current students into at least two clusters, wherein two or more students are clustered based on sameness of at least one selected attribute of their associated at least one attribute. One way of conceiving perceiving the clustering based on sameness is to consider a multidimensional space in which each dimension of the multidimensional space corresponds to an attribute. Each student is associated with a conceptual location in the multidimensional space, where the location is defined by selected attributes of the student's student attributes. The determination of sameness for two students is based on the relationship between the locations associated with the two students. When two or more students are determined to satisfy the sameness criteria they are clustered. Upon clustering, the at least one selected attribute associated with the respective students in each cluster of the at least two clusters defines a conceptual region within the multidimensional space.

One type of relationship between locations is closeness, wherein two students are clustered when their respective locations satisfy a selected condition of closeness. The degree of closeness and the way in which closeness is determined is defined by the cluster constraints or by a default value.

One measure of closeness between locations is distance. An example of a measure of distance is a Euclidean measure of distance. For example, where the location for Student A is $(a_1, b_1 \ldots n_1)$ for student attributes (a, b . . . n.), and the location for Student B $(a_2, b_2 \ldots n_2)$ then Student A and Student B may be determined as being similar or having sameness when $((a_1-a_2)^2+(b_1-b_2)^2+ \ldots (n_1-n_2)^2 \ldots )^{1/2} < a$ selected threshold that may be defined by the clustering constraints. Other examples of measures of distance include the Manhattan norm and generalized normalization procedures that prevent one attribute (e.g., one dimension of the multi-dimensional space) from outweighing other dimensions due a difference in scale of measurement. One such generalized normalization is Mahalanobis distance, which is scale-invariant, i.e. is independent of scale of measurements, and further takes into account correlations of the data set. The present disclosure is not limited to a particular measure of distance.

The determination of sameness may be based on satisfying a selected threshold distance (e.g., Euclidean, based on the Manhattan norm, or applying generalized normalization). Other methods for determining sameness include applying large scale clustering using non-negative matrix factorization on sparse graphs or other kernel clustering methods, which are described in greater detail below. One exemplary method of determining sameness uses similarity matrices. For example, let X be a K×N attribute matrix where K is the number of attributes and N the number of students. The dot product may be used as a measure of similarity between students, where the similarity matrix is given by X'X. In still another example, each student has an associated vector in which attribute data is encoded using values +1 and −1. The clustering includes determining the sameness of a first student having an associated vector u and a second student having an associated vector v, and applying a formula to u and v. In the present example the formula is $0.5*(1+\cos(u, v))$, but is not limited thereto.

As described above, sameness refers to the degree of similarity between compared students based on a combination of at least one student attribute. Different student attributes may be weighted differently for determining a degree of similarity between students. The clustering algorithm is based on "sameness" which includes grouping students together that have similarities in selected student attributes (e.g., one or more student attributes) and may further include maximizing the differentiation in those attributes between each cluster, such as by maximizing the difference between attributes of mean students of each cluster. The clustering algorithm may employ a hierarchical or non-hierarchical method, all of which are within the scope of this disclosure.

A variety of constraints specified in the request are considered by the clustering algorithm. The constraint may be weighted, giving each constraint a different level of importance. The weights used may be defaults, selected by the administrator, and/or may be specified in the request. As discussed further below, the weights and/or constraints may be adjusted by the user in an interactive fashion until the user is satisfied with the outcome. The clustering constraints specify the criteria used for clustering and control the clustering. The clustering constraints may indicate which attributes (student attribute constraints) to use for determining sameness when clustering. The weighting of the constraints in this case indicates the strength of each attribute in making the determination of sameness.

The clustering constraints may also include differentiation criteria for specifying the degree of differentiation between clusters. In this case, the constraints may even specify that the clusters should overlap. The clustering constraints may further include algorithm criteria specifying a clustering algorithm to apply for performing the clustering Other examples of clustering constraints include the number of clusters to be formed, the maximum number of students per cluster, the homogeneity of the clusters which is based on the maximum distance between two students in same cluster, etc.

In the current example, the clustering algorithm is a statistical clustering algorithm, such as the large scale clustering algorithm used in U.S. patent application Ser. No. 12/109, 496, which is incorporated herein in by reference in its entirety. Other statistical clustering algorithms or classes of algorithms useful for clustering are also within the scope of the present disclosure, such as Latent Semantic Indexing, k-means clustering, expectation maximization clustering, as are generally known to persons skilled in the art. In U.S. patent application Ser. No. 12/109,496, a sparse similarity matrix is computed which encodes a similarity between the entities to be clustered, after which a non-negative factorization is performed on the similarity matrix to generate soft cluster assignments.

Below are two examples of defining similarity:

Example (1) The goal is to cluster students according to the results of one exam. In the case where the exam is a set of D questions whose answers can be either "correct" or "incorrect" (this includes multiple choice tests, reading or spelling tests, etc.), then the results of the test are encoded as a D-dimensional vector with values +1 corresponding to correct answers and −1 corresponding to incorrect answers. The similarity between two students whose vectors are denoted u and v can thus be measured using the following formula: $0.5*(1+\cos(u, v))$. A similarity of 1 indicates perfect matching of the answers of two students (which might be used to detect cheaters), and a similarity of 0.5 indicates a perfect decorrelation. A similarity of 0 indicates anti-correlation (the two students have opposite answers to every single question (which might be used to detect complementarities).

Example (2) The goal is to cluster students for the next year. Let D be the number of grades a student obtained over one year. One can characterize the student by his D-dimensional vector of grades. The similarity between two students can be measured using any non-negative similarity between vectors such as the dot product (if grades are positive numbers).

The clustering algorithm may operate on a sparse or dense similarity matrix, depending on the type of problem being solved. For large scale clustering problems (e.g., more than a couple of thousand of predecessor or current students, such as when using data for all U.S. students in a given year that took a national exam) a sparse similarity matrix is useful, since a dense matrix is difficult to manage in terms of memory and computational cost. For clustering problems involving smaller groups of predecessor or current students (e.g. assigning current students to classes for the next year), a dense matrix may be useful.

The clustering algorithm may use a variety of non-negative matrix factorization methods. For example, a probabilistic latent semantic analysis (PLSA) is particularly suited to the student clustering problems as one can easily include constraints in the clustering, e.g. the fact that two students should be or should not be in the same class next year.

At step 210, the server 102 performs a mapping to the clusters formed in step 208 by mapping the students that were not clustered to the students that were clustered. If the predecessor students were clustered in step 208 then the current students are mapped to the clusters. Similarly, if the current students were clustered in step 208, then the predecessor students are mapped to the clusters.

The mapping is based on a degree of sameness of the particular student attributes of the respective students being mapped relative to the particular student attributes of the students in the clusters. The same method for determining sameness in the clustering step may be used for determining sameness when mapping. The students and clusters are mapped when the relationship between location associated with the student and the region associated with the cluster satisfy a selected condition provided with the mapping constraints.

The mapping constraints indicate the relationship and the condition which must be satisfied for mapping a student to a cluster or vice versa. The mapping constraints may be the same as the clustering constraints. For example, the mapping constraints may indicate that the student be mapped into the region which includes or is closest to the location associated with the student. The determination of closest may be based on the center of the region or a mean location of the region. The condition is the degree of closeness (e.g., a pre-selected distance) which must be satisfied for mapping a student to a region (or location) associated with a predecessor student. Alternatively, the determination of closeness may be based on the boundaries of the region or some other feature of the region. In the case in which the clusters are overlapping, the mapping constraints may include a priority scheme or other factors for determining which region to map a student to when its location is located in an area of overlapping regions associated with two or more clusters. The mapping constraints may be adjusted by the user in an interactive fashion until the user is satisfied with the outcome.

The algorithm used for mapping should be performed in accordance with the clustering algorithm. For instance, if one uses a K-means clustering algorithm, the mapping should be based on the Euclidean distance between the candidate student and the cluster arithmetic mean. If the large scale clustering algorithm described in U.S. patent application Ser. No. 12/109,496 is used, then expectation maximization should be used for cluster assignment during the mapping step.

The predecessor students involved in the mapping are predecessor students that are selected based on a level of performance indicating a measure of success which is specified by the success constraints. The success is indicated by some assessment measure, and may indicate success in an academic subject, a subset of an academic subject, a behavioral function, an emotional function (e.g., satisfaction), etc., as per the success constraint. The success constraints are included in the request, or determined by the administrator or default values. The success constraint may be adjusted by the user in an interactive fashion until the user is satisfied with the outcome. The success constraint may specify whether or not to and/or when to select predecessor students that will be included in the clustering and/or mapping steps based on achievement of success, e.g., in an academic, behavioral or emotional area.

For example, for the case in which the predecessor students are clustered in step 208, the success constraints may specify that only predecessor students who achieved a specified degree of success (e.g., a particular score on a particular exam or assessment of behavior or emotional state) may be selected to be included in the predecessor students that are clustered. For the case in which the current students were clustered in step 208, the success constraints may specify that in step 210 the predecessor students included in the mapping are limited to the selected predecessor students. Accordingly, the mapping process may include mapping to predecessor students based on the sameness, which is the location of the predecessor student in the multidimensional space relative to the cluster, as well as based on the success of the predecessor students. Each cluster may be matched to more than one predecessor student, and the predecessor students may be ranked based on a level of success. Each student in the cluster is correlated to the predecessor student(s) that are mapped to the cluster.

The specified degree of success threshold may be low, and the success constraint may specify that selected predecessor students are selected based on a display of a degree of success that is below the specified threshold. This can be used for a variety of goals, such as to identify and/or eliminate educational resources which have proven to be unsuccessful for similar students. At step 212, each of the current students is correlated with the educational resource that is associated with the predecessor student or cluster of predecessor students that the current student is mapped with. For the case in which the predecessor students are clustered at step 208 and a current student is mapped at step 210 to a cluster, the current student may be correlated to more than one educational resource used by students in the cluster, where the educational resources are ranked based on the degree of success achieved by the students in the cluster. For the case in which the current students are clustered at step 208 and mapped to predecessor students at step 210, each student in the cluster is correlated to the educational resource associated with the predecessor student(s) that are mapped to the cluster, and the correlation may specify the ranking of the predecessor students if a ranking was made at the mapping stage.

At step 214, the server generates an educational recommendation responsive to the request. The educational recommendation includes a recommendation for each current student of the at least one current student to use one or more determined educational resources which the current student is correlated with. At step 216, the recommendation is communicated to a user. At step 218, the server 102 receives feedback from the user, and determines whether the feedback includes either an acceptance of the recommendation or an adjustment to the request.

The user submits the feedback from the client side 150, either via the MFD or the client computing device 108 by operating the corresponding UI 128 or 132. The UI 128 or 132 may include a GUI which allows the user to adjust the request by viewing and adjusting the constraints and weights associated with the student attributes and weights included with the current request. In the current example, adjustable constraints include clustering constraints, mapping constraints, success constraints, selection of which group of students (current or predecessor) gets clustered and which group of students gets mapped to the clustered students, but are not limited thereto. Furthermore constraints may be added or eliminated.

The current request is replaced with the adjusted request, keeping in mind that all adjusted versions of the original request may be accessible to the user. If the user chooses to adjust the request, then control passes to step 220. At step 220, adjustments to the request are received. At step 222, a determination is made if the adjustments to the request criteria received at step 220 include criteria for selecting students from the predecessor group. If so, control is passed to step 206 for selecting from the predecessor group, and if not, control is passed to step 208 for clustering the selected predecessor group. If the user accepts the recommendation the procedure ends and the server waits for another request to be received.

Accordingly, the recommendation process is interactive, allowing the user to make adjustments, such as to constraints and weights of the constraints and to view the results. The user may select a set of results (e.g., an educational recommendation for student grouping and/or learning material to use) which he deems to be the best from each of the results generated during the respective iterations of the interactive process.

The adjustable constraints and their associated weights control the way in which the clustering, mapping, and selecting of students upon which the clustering and mapping is performed. The initial and adjusted values of each of the constraints and associated weights are selected. The term "selected" in this sense refers to selection by a user; by a processor, which may include based on execution of an algorithm, or in accordance with a default value (e.g., set by the manufacturer or an administrator).

Figure 4:
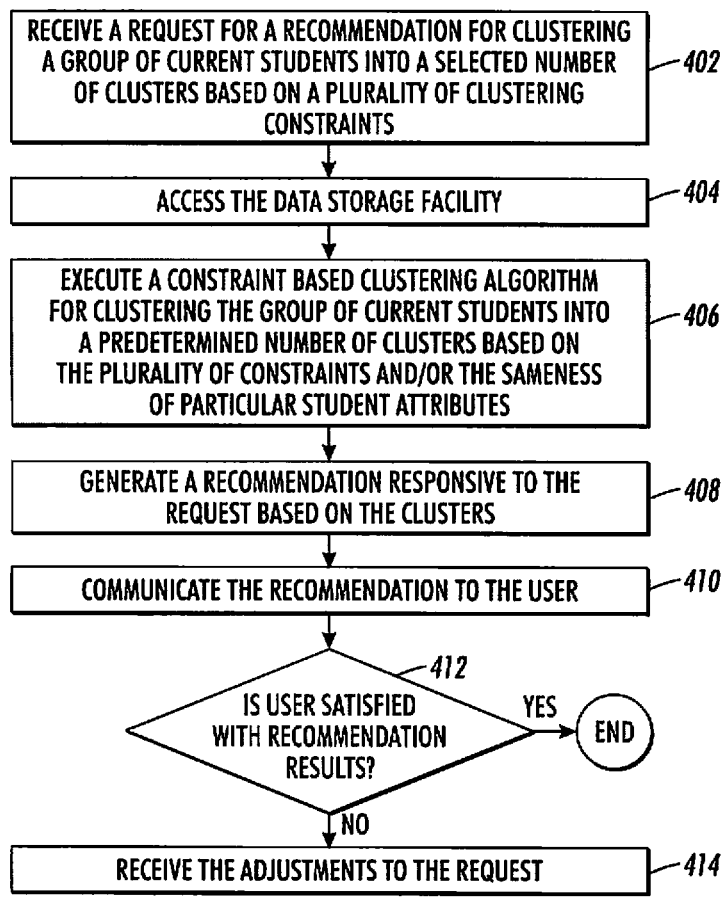

Another example of processing by the service provider 150 of a request for an educational recommendation for a group of at least one current student is now described with reference to FIG. 4. At step 402, the server 102 receives a request for a recommendation for clustering a group of current students into a selected number of clusters based on a plurality of clustering constraints. A request like this may be used, for example, by an administrator who is making class placements (which may include assigning the teachers and/or the students to particular classes) for students for the upcoming academic year, or by an educator for dividing a class up into individual groups, such as for teaching a subject (e.g., reading or math) in smaller groups, or for performing a group activity or project.

The request identifies the group of current students, and specifies the type of recommendation requested (e.g., classroom and/or assignments, group activity assignment with or without a request for educational material to be used for each group), the selected number of clusters to be formed, and the clustering constraints. The clustering constraints include logistical constraints, current student attributes constraints and/or educational resource constraints. The request may further include a weight attached to each of the clustering constraints. If no weight is attached, a default weight will be used during the clustering process.

Logistical constraints include conditions to be satisfied in accordance with the allocated weights, such as factors related to cluster composition (e.g., gender balance per cluster, balance of skill levels for a particular skill), pairing of current students to be assigned to same cluster, and pairing between a current student and an educational resource to be associated with one of the clusters, etc.).

Current student attribute constraints identify student attributes of the current students that are to be used for clustering based on the sameness of those student attributes. The student attributes included in the clustering constraints may include granular assessment data.

Educational resource constraints identify educational resources (e.g., teachers or educational materials). The educational resource constraints further specify if the clustering is to be performed based on matching current students to an educational resource that is most suitable based on the student attributes of the current students and attributes of the educational resources, or based on historical success of use of the educational resource with predecessor students. When the request specifies that clustering is based on matching, the request further specifies criteria for the matching, such as defining what constitutes a match, which current student attributes to match to educational resource attributes, and associated weights to be applied.

In general, a match generally includes a complementary relationship. For example, a student who learns well with activities that utilize a particular technique may match well with a teacher or educational material that is complementary to the student's needs or preferences, e.g., the teacher has extra expertise in that technique or the educational material utilizes or is amenable to utilizing that technique. When the clustering is based on historical success, the request may further specify selection constraints, mapping constraints, and/or success constraints to be applied in the process of clustering the current students, and the clustering constraints may further include criteria for forming the clusters, such as differentiation criteria and/or algorithm criteria.

Instead of specifying particular educational resource in the request, the request may identify particular attributes of an educational resource which are desired. In addition to clustering the identified current students, the request may further include a request to select an educational resource for each cluster based on attributes associated with the current students assigned to each cluster (e.g., based on skill level, topic interest, special need, learning style preference, etc.).

At step 404, the server 102 accesses the data storage facility 104 and accesses attributes related to the current students. If the request specifies attributes about an educational resource the server selects an educational resource having attributes which are the most similar or closest to the attributes specified in the request and uses the selected educational resource for performing the clustering. If the request specifies an educational resource, but the server determines that the data storage facility 104 does not store data (or sufficient data) related to the educational resource specified in the request, the server 104 selects a proxy educational resource which is the closest match to the educational resource specified in the request. The proxy is selected based on the attributes of the proxy and the attributes of the educational resource specified in the request. The attributes of the educational request may be specified in the request, or the server 102 may prompt the user to provide the attributes upon discovering that data related to the specified educational resource is not available in the data storage facility 104.

In another situation, when the server 102 determines that insufficient data (very little data or no data) related to success of the specified educational resource is available in the data storage facility 104, it may select an educational resource for which sufficient data or much data is stored in the data storage facility 104 to act as a proxy. Criteria for selecting a proxy may be selected by the administrator or specified in the request. The user may be prompted to provide the criteria for selecting a proxy if the need for a proxy is determined after the request is first submitted. Information submitted by the user via prompts after an initial request is submitted may be considered, for the purposes of this example, as being included in the request.

At step 406, the server 102 executes a clustering algorithm for clustering the group of current students into the selected number of clusters (e.g., at least two clusters) based on the clustering constraints. Accordingly, the clustering is based on the sameness of student attributes, e.g., the student attributes specified in the student attribute constraints and further satisfies the logistical constraints specified in the request. Each current student being clustered is associated with a location in the multidimensional space whose dimensions are defined by the student attributes specified in the student attribute constraints. The clustering includes clustering current students having a location whose relationship satisfies a selected condition to one another in accordance with selectable, weighted clustering constraints, as described with respect to FIGS. 2 and 3.

The clustering is performed in accordance with weighted constraints, where the weights and the constraints are selectable, e.g., by a user, processor in accordance with execution of an algorithm, or default values which may set at manufacturing or by an administrator. As discussed further below, the weights and/or constraints may be adjusted by the user in an interactive fashion until the user is satisfied with the outcome.

As the number and scope of clustering constraints increases (e.g., by providing constraints with the request or adding interactively), the clustering problems discussed herein begin to look more like a Constraint Satisfaction Problem, or more properly a Constraint Satisfaction Problem augmented with a number of local cost functions, wherein each local cost is related to a different constraint, rather than a single cost function related to the combination of all of the constraints, although it is known by those skilled in the art that a single cost function can be the weighted sum of many local cost functions.

A good example of this is seen in the discussion below concerning service (1), wherein a user requests classroom and teacher assignments for each current student of a group of current students, e.g., for an upcoming academic year. While Branch-and-Bound or Bucket Elimination algorithms may be used, the algorithm discussed below concerning service (1) is similar to the well-known Greedy SAT (GSAT) algorithm, wherein "greedy" refers to a greedy local search and "SAT" refers to a Boolean or Propositional Satisfiability Problem. GSAT performs a greedy local search for a satisfying assignment of a set of propositional clauses, which are based on the constraints (e.g., the logistical constraints) and written in a Boolean format. The procedure begins with a randomly generated truth assignment after which it changes ('flips') the assignment of the variable that leads to the largest increase in the total number of satisfied clauses. Such flips are repeated until either a satisfying assignment is reached or a pre-selected number of flips is performed. The process is repeated as needed, up to a maximum number of repetitions.

When the request specifies that the clustering should be performed based on finding a match between attributes associated with the respective clusters of current students to attributes associated with educational resources identified in the request, the server 102 compares attributes. In this case the attributes compared are those associated with current students in each respective cluster of current students to attributes associated with the educational resources or proxies associated with the educational resources. The attributes to be compared may be specified in the request or may be the same attributes used for clustering the current students. The content of the attribute information may be provided in the request, stored in the data storage facility 104 or may have been used when determining the clusters of current students.

The server 102 matches the attributes of the each cluster of current students to the attributes of respective the educational resources or associated proxies based on criteria for matching students and resources supplied in the request as matching constraints (or default criteria for matching if none were specified). Each cluster of current students is mapped to the educational resource it best matches to. The educational resource mapped to each cluster of current students is recommended for the cluster of current students.

When the request includes a request to use historical information about success related to usage of an educational resource, the data storage facility consults predecessor student data for students having experiences with the respective identified educational resources. The predecessor student data may be narrowed down based on selection constraints (which are either provided in the request or selected by the administrator).

More specifically, in the current example, an analysis of each educational resource identified in the request is performed by selecting all of the predecessor students that performed successfully (or unsuccessfully) using that educational resource or associated proxy, e.g., as indicated by assessment data, e.g., in accordance with some pre-selected threshold level specified in the success constraints (which are either provided in the request or selected by the administrator). The predecessor students may be selected based on successful performance, which is indicated by surpassing a relatively high threshold, or unsuccessful performance, which is indicated by falling below a relatively low threshold.

The selected predecessor students are clustered into the number of clusters specified in the request based on the clustering constraints. The clustering is based on sameness of the same student attributes that were used for clustering the current students. The clusters of current students are mapped in accordance with mapping constraints to the clusters of predecessor students based on sameness of the student attributes used for clustering the current students and predecessor students. Each cluster of current students is correlated to the educational resource (or educational corresponding to the proxy) successfully used by the cluster of predecessor students that the cluster of current students is mapped to.

The determination of similarity between the current students and the selected predecessor students may be conceived of with respect to the conceptual multidimensional space described above. The attributes of each selected predecessor and current student defines a location in the multidimensional space. If there are more than one selected predecessor students, their associated attributes may describe one or more regions in the multidimensional space, where locations whose relationship satisfies a selectable condition (e.g., are relatively close based on a selected threshold value) define a region. The constraint defining the relationship between locations and the selectable condition needed for forming a region, referred to as a closeness constraint, may be included in one of the clustering constraints that is selectable and adjustable by the user. When there is a selected predecessor student which has a location that does not satisfy the selectable condition and therefore is not included into a region described by the other selected predecessor students, that predecessor student may not join a region and may stand alone in an isolated location.

The sameness used for mapping the clusters of current students to the clusters of predecessor students is determined based on a relationship between the locations occupied by the regions associated with the respective clusters of current students and the regions associated with the clusters of predecessor students. Each cluster of current students is mapped to the cluster of predecessor students whose region satisfies a selectable condition specified in the mapping constraints (e.g., similar to mapping constraints described with respect to FIGS. 2 and 3). For example, the condition may be based on the relationship between mean locations of each of the clusters.

At step 408, a recommendation responsive to the request is generated based on the results of the clustering. The recommendation includes clusters formed of current students. The recommendation may further include the educational material correlated to each cluster. At step 410, the recommendation is communicated to a user for clustering the current students into the clusters generated in step 406.

At step 412, the server 102 waits for feedback from the user, and determines whether the feedback includes either an acceptance of the recommendation or an adjustment to the request. The user submits the feedback from the client side 150, either via the MFD or the client computing device 108 by operating the corresponding UI 128 or 132 such as by adjusting the constraints and weights associated with the student attributes and constraints included with the current request. Adjustable constraints include clustering constraints, mapping constraints, selection constraints, success constraints, criteria for matching students and resources, etc. Additionally constraints can be removed or added. The current request is replaced with the adjusted request, keeping in mind that all adjusted versions of the original request may be accessible to the user.

If the user chooses to adjust the request, then control passes to step 414. At step 414, the server 102 receives the adjustments to the request, after which control is passed to step 408 for clustering the current students. If the user accepts the recommendation, then the procedure ends at step 416 and the server 102 waits for another request to be received.

Accordingly, the recommendation process is interactive, allowing the user to make adjustments, such as to constraints and weights of the constraints and to view the results. The user may select a set of results (e.g., an educational recommendation for student grouping and/or learning material to use) which he deems to be the best from each of the results generated during the respective iterations of the interactive process.

The constraints and their associated weights control the way in which the clustering, mapping, matching of resources to students, and selecting of students upon which the clustering, matching and mapping is performed. The initial and adjusted values of each of the constraints and associated weights are selected. The term "selected" in this sense refers to selection by a user; by a processor, which may include based on execution of an algorithm, or in accordance with a default value (e.g., set by the manufacturer or an administrator). The term "pre-selected" throughout the application has the same meaning as the term "selected" described here.

Nine applications of the recommender system 100 are now described. In a first application, referred to as service (1), a user requests classroom and teacher assignments for each current student of a group of current students, e.g., for an upcoming academic year. The following example is for assigning a plurality of current students to elementary school classrooms. The user submits a request to provide classroom and teacher assignments for all students being promoted to a specified grade level.

The user provides the following information to the recommender system 100 with the request: the grade level for which students are to be assigned to teachers so that the system can retrieve the appropriate student roster from the data warehouse, a roster of current students for which classroom or teacher assignments are needed; attribute information for each student on the roster that does not yet have related attribute information stored in the data warehouse 140; a list of each teacher that will be teaching a classroom; attribute information for each teacher listed that does not yet have related attribute information stored in the data warehouse 140; and any pre-assigned placements for specified students (the placement of the pre-assigned students may be fixed).

Constraints provided in the request include the number of classrooms to be formed, the desired class size range for each classroom or an absolute class size for each classroom, distribution of strengths or weaknesses in each of the clusters (e.g., in reading, math, leadership qualities); weighting factors for equally distributing the number of special student needs across classroom clusters, weighting factors for minimizing the total types of needs in each classroom cluster; student/teacher compatibility criteria (weighted) (e.g., for matching compatibility of teachers' teaching modes to students' learning modes; teachers' disposition to students' preference, etc.); pairs of students to place together (weighted); pairs of students to not be placed together (weighted); student/teacher pairs to be matched together (weighted); student/teacher pairs to not be matched (weighted).

The request further designates whether historical success rates of the teacher's receiving classroom placements should be used as a constraint, and if so, the request includes clustering criteria for performing the clustering involved in using the historical data. Additional constraints that may be included with the request may include selection constraints, clustering constraints, mapping constraints, and/or success constraints, each of which may be weighted. In the solution below, as seen in Table 2, relative satisfaction of the numerous and various constraints is given by a vector quantity, referred to as the "the vector of fitness", which is similar to the (scalar) measure of the largest increase in the number of satisfied propositional clauses as noted above in the discussion about GSAT. Table 2 shows the steps of method performed by the server 102 for implementing service (1):

TABLE 2

1. Calculate the size of each cluster in order to keep the number of students in each cluster roughly equal
2. Set the number of restarts to zero
3. Seed an initially blank solution (which is the initial current best solution) with the pre-assigned students whose assignment in a cluster is fixed as provided in the input request
4. According to the cluster size, randomly fill the remaining slots of each cluster with students that were not fixed by pre-assignment such that the gender balance constraint is respected (which must take into account students already assigned to the cluster)

TABLE 2-continued

5. Set the number of trials to zero
6. Create a new solution candidate by swapping two non-fixed students of the same gender from two different clusters
7. Calculate vector of fitness scores of the new solution candidate
8. If the vector of fitness score for the new solution candidate is better than the vector of fitness score for the current best solution then:
    Replace the current best solution by the new solution candidate
    Reset the number of trials to zero
    Otherwise undo the swapping
9. Increase the number of trials by one
10. If the maximum number of trials has not been exceeded, then go to Step 6
11. Increase the number of restarts by one
12. If the maximum number of restarts has not been exceeded, then go to Step 3
13. Return the best solution found In the above steps, there are two parameters that the user can set, namely the maximum number of restarts and the maximum number of trials. The server 102 returns a recommendation for clustering the students which best satisfies the constraints of the request.

In a second application, referred to as Service (2), a user requests that the recommender service 100 schedule students amongst a population of current students who may benefit from tutoring with a tutor selected from a population of candidate tutors. The request includes identification and/or attribute data for the population of current students and the population of candidate tutors.

The request provides a number of constraints, including subject or topic areas to be considered for tutoring services; logistical scheduling constraints, e.g., based on time, availability and location; assessment score conditions that show a need for tutoring intervention; whether the tutors to be recommended must have credentials (e.g., training or experience); areas of compatibility to be matched, preferences for group tutoring or individual tutoring; preferences for learning modes; common history of challenges (common to current student and tutor); common interests; minimum success rate of tutor with similar students on topic; and success rate of tutors similar to the tutor with similar students. The constraints may further specify exception requirements that override the other constraints, such as student pairs for group tutoring (weighted); tutor student pairs (weighted); tutor pairs (weighted); current students with absolute need for tutoring in a particular topic; current students with absolute need for a particular tutor on a topic. Additional constraints that may be included with the request may include selection constraints, clustering constraints, mapping constraints, and/or success constraints, each of which may be weighted.

The recommender service 100 receives requests for all current students with tutoring needs for skills or topics of study. Coupled (student, topic) pairs students are formed, realizing that a student can be listed in as many coupled pairs for which he/she has tutoring needs. For each specific tutoring need, a predecessor group of tutors is found who have tutored students with a similar need. Using the predecessor group, the coupled (tutor, student) pairs are formed and these pairs are rank-ordered based on the success of each predecessor student tutored in accordance with assessment data associated with the predecessor student.

Using a measure of sameness, each current student is matched with a successful predecessor student to identify the best tutor for each respective (current student, topic) pair. Applying preferences and constraints (provided in the attributes associated with the current student and the identified tutor and in the request), groups of current students for the identified tutor for this topic are aggregated. If the identified predecessor tutor is not available, a different currently available tutor for this (current student, topic) pair is found that is similar, based on a measure of sameness, to the identified predecessor tutor. Again, applying preferences and constraints, groups of current students for the identified tutor for this topic are aggregated. The recommender service recommends tutoring for selected students that are identified as needing tutoring and further recommends for each selected student group or individual tutoring, the groupings to be used and the tutor to use for the selected student or his group.

In a third application, referred to as Service (3), a user requests that the recommender service 100 recommend clustering of a population of current student into one or more clusters for collaborative peer assistive learning activities, and may request a recommendation for learning materials to use for the respective clusters. The request specifies the population of current students that should be processed for clustering. The request may further include the following constraints: the number of clusters (which may be provided as a range, e.g., 4-6) which are to be formed; the minimum or maximum number of students to be included in each cluster, student attributes that are to be used for determining sameness for the purpose of clustering (each attribute weighted), such as learning modes, history of challenges (as indicated by granular assessment data), common academic interests, common non-academic interests; whether the clustering should be based on historical success of the respective students and/or similar students respective students with clustering for peer assisted learning activities (weighted). Additional constraints that may be included with the request may include selection constraints, clustering constraints, mapping constraints, and/or success constraints, each of which may be weighted.

The server 102 executes a constraint-based clustering algorithm for clustering the population of current students into clusters in accordance with the constraints. If a recommendation for educational materials is recommended, the server 102 determines a predecessor group of students, such as in accordance with the grade, skill-level and topic to be studied. For each of the clusters of current students formed a similar cluster of predecessor students is determined based on sameness of the predecessor students to the attributes of the current student cluster. The educational materials, including physical materials, digital materials and/or methods of instruction, used by each cluster of predecessor students is rank-ordered based on success of the predecessor student as indicated by the predecessor students' assessment data.

The recommender service 100 outputs to the user a recommendation recommending the current student clusters generated for collaborative peer assistive learning activities, and if a recommendation for educational materials was requested, the educational materials used by the predecessor group in the determined rank-order. If the user is not satisfied with the recommendation, the user may make adjustments to the request, such as to the constraints used for clustering the current students, the criteria for selecting predecessor students and/or adding or removing students from the population of current students, after which the server 102 outputs a different recommendation to the user. This process continues until the user is satisfied.

In a fourth application, referred to as Service (4), a user requests that the recommender service 100 recommend clustering of students of a single classroom for cooperative oral reading in groups, in which each student reads aloud to the group concerning a topic of common interest. The request may further request that the recommender service 100 recommend reading material to be used for each reading group.

The request specifies the current students in the classroom. The request may further include the following constraints: the number (or range) of clusters to be formed, the minimum or maximum number of students per cluster, the reading ability distribution for each cluster (weighted) (e.g., by percentage of the reading ability of the whole class); overlap of reading ability of clusters (weighted) (e.g., by percentage of average ranges of the reading ability of the groups); the degree of commonality of interests of students in each group (weighted); and pairs of students to be clustered together in the same reading groups (weighted). Additional constraints that may be included with the request may include selection constraints, clustering constraints, mapping constraints, and/or success constraints, each of which may be weighted.

The server 102 performs steps similar to those described for Service (3), including executing a constraint-based clustering algorithm for clustering the population of current students into clusters in accordance with the constraints, and rank-ordering for each cluster the reading material used by predecessor students having sameness to the clusters. The rank-ordering may be based on assessment data that reflects academic performance and/or student satisfaction. The recommender service 100 outputs to the user a recommendation recommending the break down of the classroom into reading groups for cooperative oral learning, and reading material to be used by each reading group per the rank-order determined. If the user is not satisfied with the recommendation, the user may make adjustments to the request. The reading material recommended may be NLP modified so that reading level of the material will match the reading level of the student reading it. U.S. patent application Ser. No. 12/054,824 describes a system and method for NLP modifying reading material to match a reader's reading level, the entire contents of which are incorporated by reference herein in their entirety.

In a fifth application, referred to as Service (5), a user requests that the recommender service 100 recommend clustering a population of current students into independent study groups and may further request that the recommender service 100 recommend one or more educational resources for each group. This application can also be used for recommending educational resources to an un-clustered group of current students or to a single current student. The educational resource recommended may be a teacher, a tutor, reading material, an instructional method, etc.

The groups, in this example, are requested to be formed based on similarities in reading level and receptivity to a particular topic or subject. The students in each group will use the same educational materials and be subjected to the same methods of instruction, but will work independently. The request specifies the current students in the population of current students (which may be one current student or many), specific educational material to be selected from, specifications for learning material (e.g., topic or subject matter of the material, how much material, desired attributes of the material). The request may further include the following constraints: the number (or range) of clusters to be formed (which is one or more), the minimum or maximum number of students per cluster, the degree of commonality of interests of students, learning modes and/or history of challenges (as indicated by granular assessment data) in each group (weighted); and/or pairs of students to be clustered together in the same group (weighted); and/or whether the clustering should be based on historical success of the student or of similar students with similar reading materials or topics.

Figure 5:
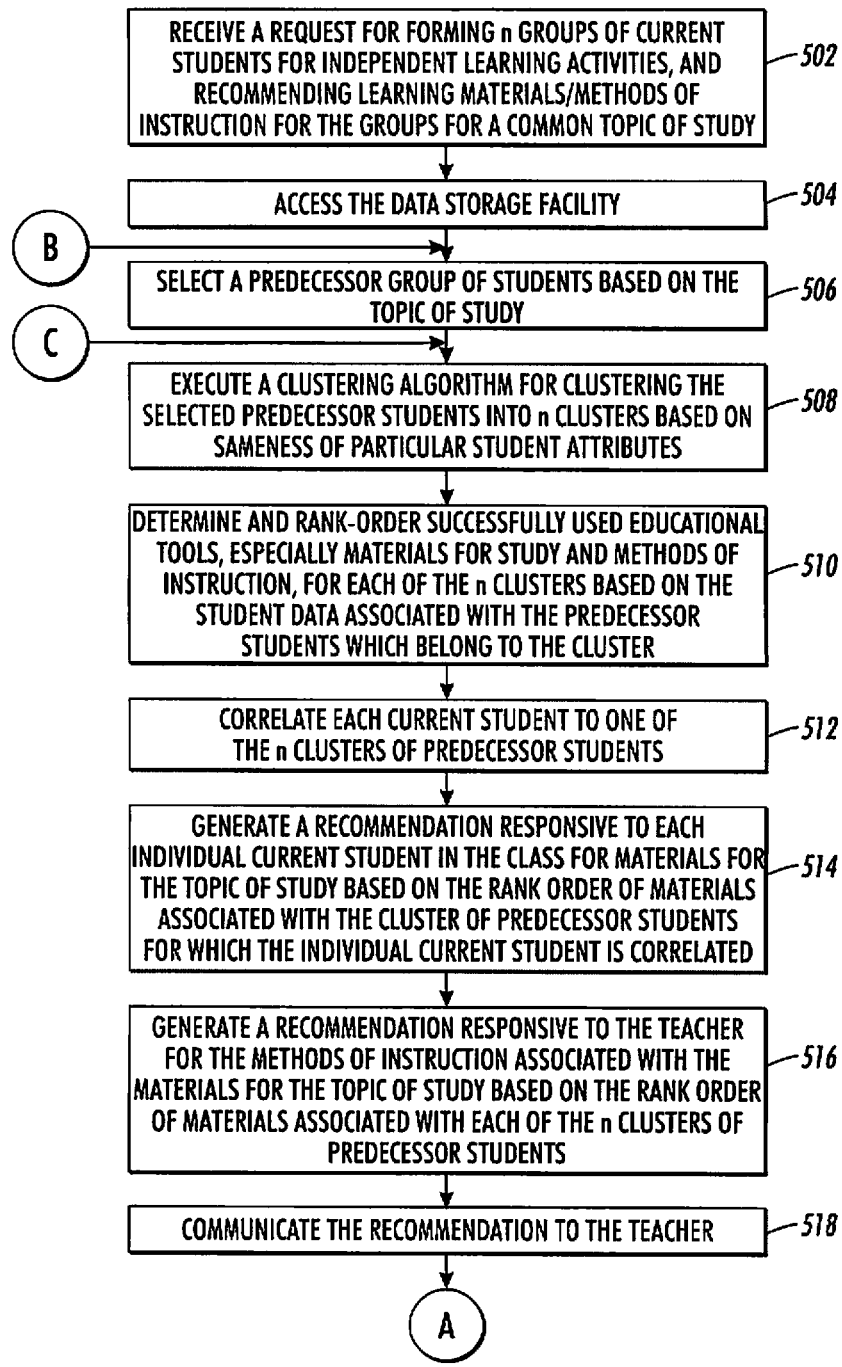
FIGS. 5 and 6 show a flowchart of a method used by the educational recommender system shown in FIG. 1 for grouping students for independent learning activities and for recommending educational materials to use in accordance with the present disclosure.
Figure 6:
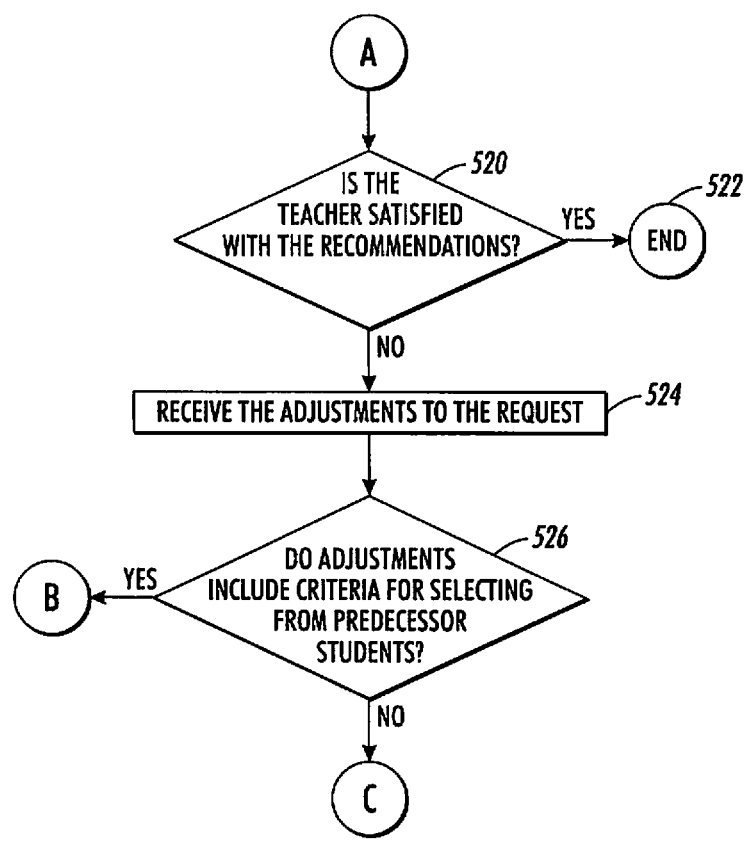

The steps performed by the server 102 are described with reference to FIGS. 5 and 6. At step 502, the request is received from a user, which in this example is a teacher. At step 504, the data storage facility 104 is accessed. At step 506 a predecessor group is selected based on the topic of study. At step 508, a clustering algorithm is executed for clustering the selected predecessor students based on sameness of their student attributes specified in the clustering constraints provided with the request. The number of clusters is in accordance with the number of independent study groups desired. At step 510, the successfully used educational materials associated with the students included in each cluster are rank-ordered. At step 512, each current student is correlated or mapped to one of the clusters of predecessor students.

In the special case in which there is only one cluster of current students (which may include one or more students), step 512 is omitted. The clustering performed in step 508 includes clustering predecessor students based on sameness of student attributes to the population (single cluster).

At steps 514 and 516, recommendations are generated for each current student in the current student population, including a cluster assignment for each current student and educational materials, including instructional methods to be used for each cluster. At step 518, the recommendation is communicated to the teacher. At step 520, a determination is made if the teacher is satisfied with the recommendations. If so, the procedure ends at step 522. If not, adjustments to the request made by the teacher are received at step 524. At step 526, a determination is made if the adjustments include adjustments to criteria for selecting the predecessor students. If so, control is returned to step 506 which is executed with the adjustments made by the teacher. If not, control returns to step 508, which is executed with the adjustments made by the teacher.

In a sixth application, referred to as Service (6), a user requests that the recommender service 100 recommend clustering a population of current students into learning groups for cooperative activities related to a specific subject or topic and may further request that the recommender service 100 recommend educational material for each group. The students in each group will use the same educational materials and be subjected to the same methods of instruction and will work cooperatively. The request specifies the current students in the population of current students (which in this example is a single classroom), any specific educational material to be selected from, any specifications for learning material (e.g., topic or subject matter of the material, how much material, and desired attributes of the material).

The request may further include the following constraints: the number (or range) of clusters to be formed, the minimum or maximum number of students per cluster, the degree of commonality of interests of students, learning modes and/or history of challenges (as indicated by granular assessment data) in each group (weighted); and/or pairs of students to be clustered together in the same group (weighted); and/or whether the clustering should be based on historical success of the student or of similar students with similar reading materials or topics. Additional constraints that may be included with the request may include selection constraints, clustering constraints, mapping constraints, and/or success constraints, each of which may be weighted.

Figure 7:
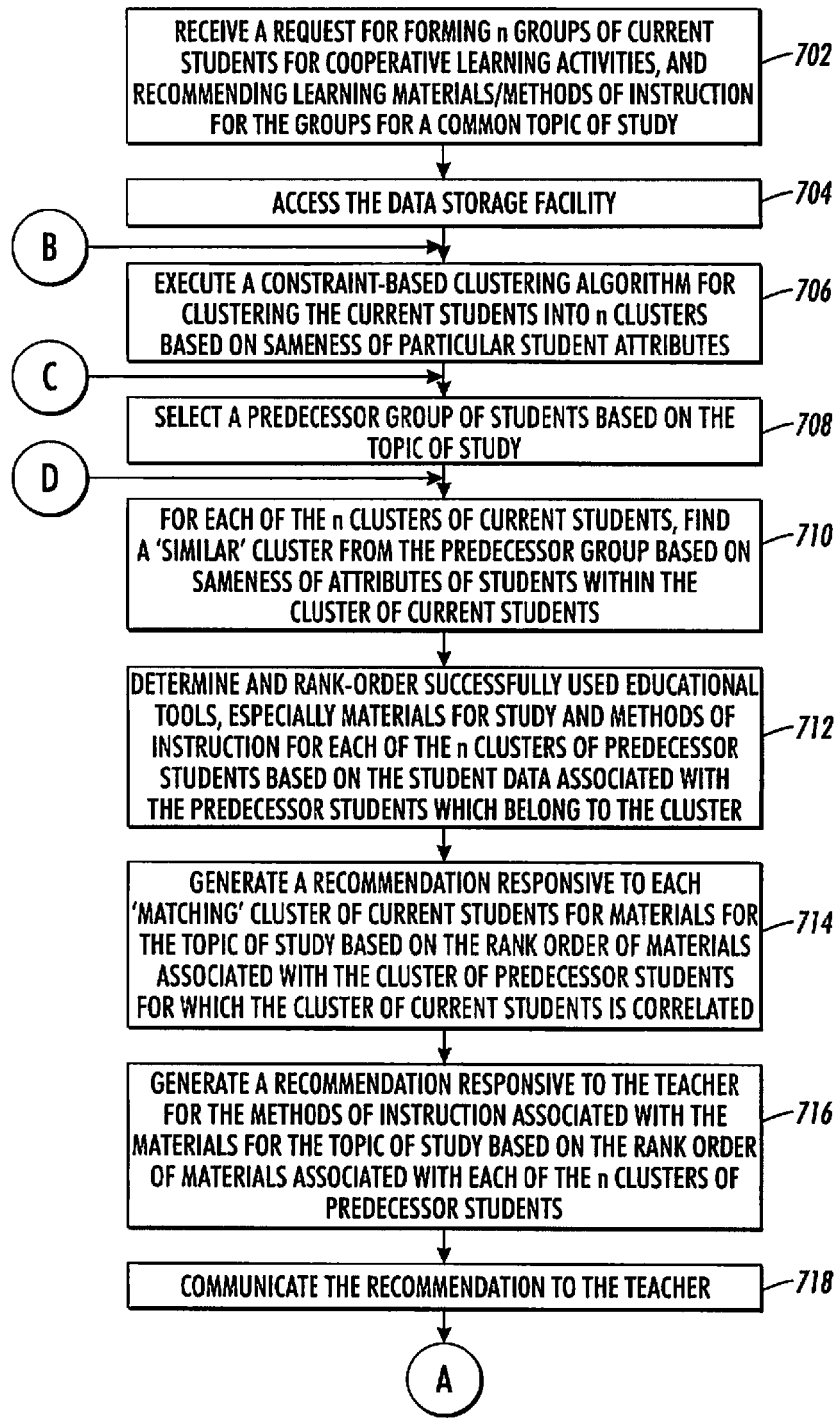
FIGS. 7 and 8 show a flowchart of a method used by the educational recommender system shown in FIG. 1 for grouping students for cooperative learning activities and for recommending educational materials to use in accordance with the present disclosure.
Figure 8:
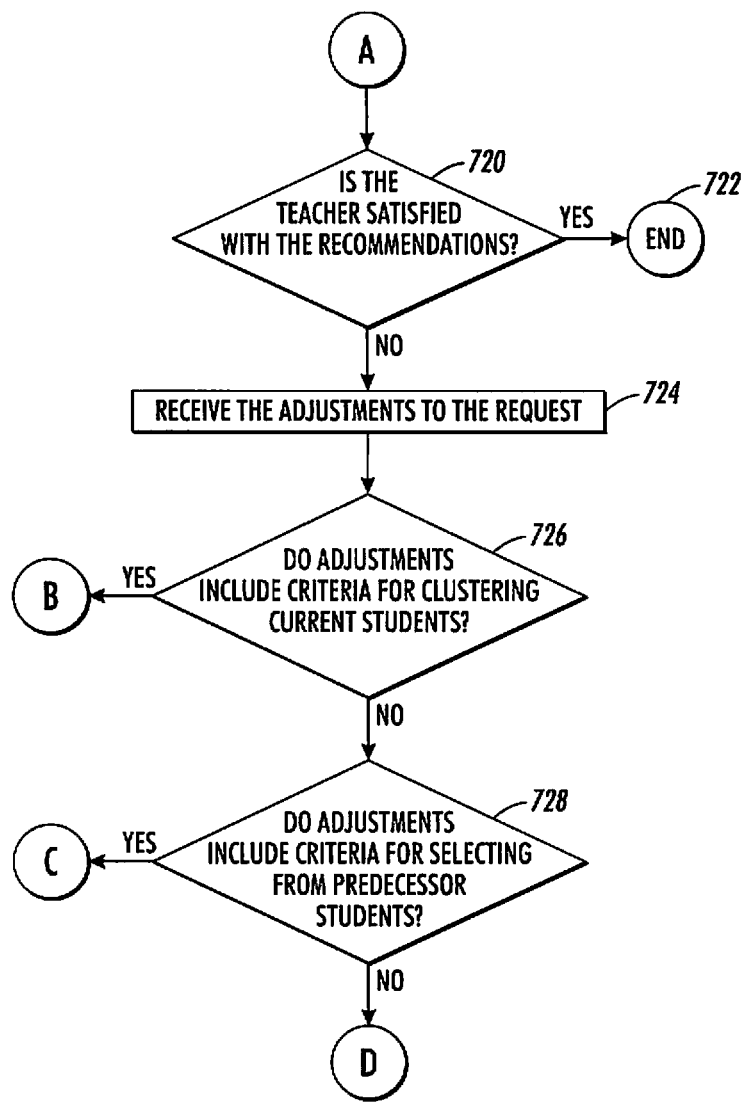

Steps performed by the server 102 are similar to the steps performed in services (3) and (4) and is further described with reference to FIGS. 7 and 8. At step 702, the request is received from a user, which in this example is a teacher. At step 704, the data storage facility 104 is accessed. At step 706, a constraint based clustering algorithm is executed for clustering the current student population into clusters based on sameness of student attributes specified in clustering constraints provided with the request. At step 708, a predecessor group is selected based on the topic of study. At step 710, the selected predecessor students are mapped to the clusters of current students, wherein the mapping is based on sameness of their student attributes. At step 712, the successfully used educational materials associated with the students included in each group of predecessor students mapped to a respective cluster are rank-ordered.

At steps 714 and 716, recommendations are generated for each current student in the current student population, including a cluster assignment for each current student and educational materials, including instructional methods to be used for each cluster. At step 718, the recommendation is communicated to the teacher. At step 720, a determination is made if the teacher is satisfied with the recommendations. If so, the procedure ends at step 722. If not, adjustments to the request made by the teacher are received at step 724. At step 726, a determination is made if the adjustments include adjustments to criteria for clustering the classroom students. If so, control is returned to step 706 which is executed with the adjustments made by the teacher. If not, a determination is made at step 728 if the adjustments include criteria for selecting from the predecessor students. If so, control returns to step 708, which is executed with the adjustments made by the teacher. If not, control returns to step 710, which is executed with the adjustments made by the teacher.

Additional applications for the recommender service 100 include recommending options for intervention protocols for students identified with special needs; identifying current students that have learning content gaps and need educational intervention and recommending materials to use for providing educational intervention; and identifying current students that are at risk of falling behind at a particular point of a curriculum, and recommending interventions to use.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A recommender system for recommending clustering of students into educational groups, the recommender system comprising:
 a processor for executing a series of programmable instructions for:
  receiving a request to recommend a course of action related to a plurality of current students;
  generating granular assessment data, the generating including:
   processing assessment documents by capturing and evaluating each free-form mark provided in response to at least one assessment item administered to the current students;
  accessing the granular assessment data and at least one attribute including one of student data, educator data, and educational material data for each of the current students and a plurality of predecessor students;
  for a first one of the current and predecessor students, processing a clustering algorithm using the granular assessment data and the at least one student, educator, and educational material data;
  using a mapping algorithm in accordance with the clustering algorithm, mapping a second one of the current and predecessor students to the first one of the current and predecessor students;
  using the mapping, correlating one of each current student to a course of action associated with a cluster of predecessor students and a cluster of current students to a course of action associated with a predecessor student; and,
  for the cluster of current students and current student, outputting a course of action associated with the one of the predecessor student and cluster of predecessor students, respectively;
 wherein each student of the plurality of students is associated with a D-dimensional vector encoding granular assessment data for that student, wherein the vector includes values indicative of an evaluation of each answer to D respective questions, wherein the value for each question of the D questions is +1 for a correct answer and −1 for an incorrect answer; and
  wherein the clustering includes determining a similarity of a first student having an associated vector u and a second student having an associated vector v, and applying the formula $0.5*(1+\cos(u, v))$ to u and v.

2. The recommender system in accordance with claim 1, wherein the granular assessment data is obtained from at least the free-form markings extracted from assessment answer sheets scanned in via a multifunctional device (MFD), wherein each assessment answer sheet is used for recording answers to questions associated with an assessment administered to a student of the plurality of students.

3. The recommender system in accordance with claim 1, wherein the course of action in the request is to make classroom assignments for the plurality of current students.

4. The recommender system in accordance with claim 1, wherein the course of action in the request is to form the plurality of current students into individual groups for performing an educational activity.

5. The recommender system in accordance with claim 1, wherein the request includes a plurality of constraints that control the clustering.

6. The recommender system in accordance with claim 5, wherein the constraints include a plurality of logistical constraints which must be satisfied by the clustering.

7. The recommender system in accordance with claim 5, wherein a clustering algorithm is a constraints based algorithm for satisfying a constraint satisfaction problem.

8. The recommender system in accordance with claim 6, wherein the respective constraints of the plurality of constraints have associated weights, and the clustering is further based on the weights of the associated constraints.

9. The recommender system in accordance with claim 8, the processor further executing programmable instructions for receiving adjustments from the user to at least one of the plurality of constraints and the associated weights; and repeating the clustering, outputting and receiving adjustments until the user is satisfied with the output results.

10. The recommender system in accordance with claim 1, wherein the data storage facility further stores resource data including attributes related to a plurality of educational resources, the course of action in the request includes recommending an educational resource for at least one of the clusters, and the processor further executes programmable instructions for: accessing the resource data; and based on its related attributes recommending an educational resource for respective clusters of the selected number of clusters based on at least one attribute related to the recommended educational resource.

11. The recommender system in accordance with claim 10, wherein the educational resource includes at least one of an educator, physical educational material, digital educational material and an instructional method.

12. The recommender system in accordance with claim 10, wherein the student data includes data indicating needs or preferences of the respective students and the resource data includes data indicating strengths or capabilities of the respective resources, and the educational resource recommended for a particular cluster is recommended when resource data associated with the resource indicates that the resource's strengths or capabilities are compatible with needs or preferences of the particular cluster indicated by the student data associated with the students included in the particular cluster.

13. The recommender system in accordance with claim 10, wherein recommending the educational resource is further based on a selected level of performance as indicated by the granular assessment data associated with at least one predecessor student of the plurality of students, which are students of the plurality of students, other than the current students, that have prior experience with a course of action related to the course of action in the request, wherein the granular assessment data that the recommendation is based on is related to an assessment reflective of a student's performance based on experience with the recommended educational resource or an educational resource that has attributes which are similar to the attributes of the recommended educational resource.

14. The recommender system in accordance with claim 10, wherein the educational resource includes natural language processing (NLP) reading material which is digitally modifiable to provide a reading level compatible with a reading level associated with the cluster it is recommended for, wherein the reading level associated with the cluster is determined based on the granular assessment data.

15. The recommender system in accordance with claim 1, wherein the clustering is further based on a selected level of performance as indicated by the granular assessment data associated with at least one predecessor student of the plurality of students, which are students of the plurality of students, other than the current students, that have prior experience with a course of action related to the course of action in the request.

16. The recommender system in accordance with claim 15, wherein the student data further includes, associated with each student of the plurality of students, student attribute data describing at least one attribute of the student, and wherein the at least one predecessor student is selected based on the similarity of the student data associated with the at least one predecessor student relative to the student data associated with the plurality of current students.

17. The recommender system in accordance with claim 16, wherein the student data associated with each respective student defines a location within a multidimensional space whose dimensions are each related to a respective attribute, wherein selected attributes of the at least one attribute and selected granular assessment student data are each associated with a respective dimension of the multidimensional space, wherein the selection of the at least one predecessor student based on the similarity of the student data includes selecting based on a relationship between the locations associated with respective students of the at least one predecessor student and respective current students of the plurality of current students.

18. The recommender system in accordance with claim 1, wherein the clustering includes using non-negative matrix factorization.

19. The recommender system in accordance with claim 1, wherein the clustering includes using probabilistic latent semantic analysis.

20. A method for recommending clustering of students into educational groups, the method comprising:
receiving a request at a processor to recommend a course of action related to a plurality of current students;
using the processor, acquiring granular assessment data including evaluating each free-form mark captured in response to at least one assessment item administered to the current students;
using the processor, accessing the granular assessment data and at least one attribute including one of student data, educator data, and educational material data for each of the current students and a plurality of predecessor students;
for a first one of the current and predecessor students, processing a clustering algorithm using the granular assessment data and the attribute; using a mapping algorithm in accordance with the clustering algorithm, mapping a second one of the current and predecessor students to the first one of the current and predecessor students;
using the mapping, correlating one of each current student to a course of action associated with a cluster of predecessor students and a cluster of current students to a course of action associated with a predecessor student cluster based on similarity; and,
for the cluster of current students and current student, outputting a course of action associated with the one of the predecessor student and cluster of predecessor students, respectively;
wherein each student of the plurality of students is associated with a D-dimensional vector encoding granular assessment data for that student, wherein the vector includes values indicative of an evaluation of each answer to D respective questions, wherein the value for each question of the D questions is +1 for a correct answer and −1 for an incorrect answer; and
wherein the clustering includes determining a similarity of a first student having an associated vector u and a second student having an associated vector v, and applying the formula $0.5*(1+\cos(u, v))$ to u and v.

21. The method according to claim 20, wherein the clustering is performed in accordance with at least one user adjustable clustering constraint, wherein the at least one adjustable clustering constraint is selected from the group of clustering constraints consisting of: a student attribute constraint specifying attribute data included in the student data describing attributes related to respective students of the plurality of students to use for determining similarity when the clustering is based on similarity, a differentiation constraint for specifying a degree of differentiation between clusters, a cluster size constraint specifying a minimum number of students to include in each cluster, a maximum number of students to include in each cluster, the selected number of clusters, and an algorithm constraint specifying a clustering algorithm to apply.

22. The method according to claim 20, further comprising:
accessing resource data in the computer database describing attributes related to a plurality of educational resources;
recommending an educational resource for respective clusters of the clusters based on the resource data and the student data corresponding to students included in the respective cluster.

23. The method according to claim 22, wherein the student data includes data indicating needs or preferences of the respective students and the resource data includes data indicating strengths or capabilities of the respective resources, and the educational resource recommended for a particular cluster is recommended when resource data associated with the resource indicates that the resource's strengths or capabilities are compatible with needs or preferences of the particular cluster indicated by the student data associated with the students included in the particular cluster.

24. The method according to claim 20, wherein the clustering is further based on a selected level of performance as indicated by the granular assessment data associated with at least one predecessor student of the plurality of students, which are students of the plurality of students, other than the current students, that have prior experience with a course of action related to the course of action in the request.

25. The method according to claim 24, wherein the student data further includes, associated with each student of the plurality of students, student attribute data describing at least one attribute of the student, and wherein the at least one predecessor student is selected based on the similarity of the student data associated with the at least one predecessor student relative to the student data associated with the plurality of current students.

26. The method in accordance with claim 25, wherein the student data associated with each respective student defines a location within a multidimensional space whose dimensions are each related with a respective attribute, wherein selected attributes of the at least one attribute and selected granular assessment student data are each associated with a respective dimension of the multidimensional space, wherein the selection of the at least one predecessor student based on the similarity of the student data includes selecting based on a relationship between the locations associated with respective students of the at least one predecessor student and respective current students of the plurality of current students.

27. The method in accordance with claim 20, wherein the clustering includes using non-negative matrix factorization.

28. The method in accordance with claim 20, wherein the clustering includes using probabilistic latent semantic analysis.

29. A non-transitory computer-readable medium storing a series of programmable instructions configured for execution by at least one processor for recommending clustering of students into educational groups comprising the steps of:

receiving a request to recommend a course of action related to a plurality of current students;

acquiring granular assessment data including evaluating each free-form mark captured in response to at least one assessment item administered to the current students;

accessing the granular assessment data and at least one attribute including one of student, educator, and educational material data that corresponds to each of the current students and a plurality of predecessor students;

for a first one of the current and predecessor students, processing a clustering algorithm using the granular assessment data and the attribute;

using a mapping algorithm in accordance with the clustering algorithm, mapping a second one of the current and predecessor students to the first one of the current and predecessor students;

using the mapping, correlating one of each current student to a course of action associated with a cluster of predecessor students and a cluster of current students to a course of action associated with a predecessor student cluster based on similarity; and, for the cluster of current students and current student, outputting a course of action associated with the one of the predecessor student and cluster of predecessor students, respectively;

wherein each student of the plurality of students is associated with a D-dimensional vector encoding granular assessment data for that student, wherein the vector includes values indicative of an evaluation of each answer to D respective questions, wherein the value for each question of the D questions is +1 for a correct answer and −1 for an incorrect answer; and wherein the clustering includes determining a similarity of a first student having an associated vector u and a second student having an associated vector v, and applying the formula $0.5*(1+\cos(u, v))$ to u and v.

30. The non-transitory computer-readable medium according to claim 29, wherein the course of action in the request is to make classroom assignments for the plurality of current students.

31. The non-transitory computer-readable medium according to claim 29, wherein the course of action in the request is to form the plurality of current students into individual groups for performing an educational activity.

* * * * *